(12) United States Patent
Kishigami et al.

(10) Patent No.: US 8,726,117 B2
(45) Date of Patent: May 13, 2014

(54) WIRELESS ERROR CORRECTING TRANSMISSION APPARATUS, AND ERROR CORRECTING TRANSMISSION DATA FORMATION METHOD

(75) Inventors: Takaaki Kishigami, Tokyo (JP); Isamu Yoshii, Kanagawa (JP)

(73) Assignee: Panasonic Corporation, Osaka (JP)

( * ) Notice: Subject to any disclaimer, the term of this patent is extended or adjusted under 35 U.S.C. 154(b) by 231 days.

(21) Appl. No.: 13/146,606

(22) PCT Filed: Jan. 29, 2010

(86) PCT No.: PCT/JP2010/000542
§ 371 (c)(1),
(2), (4) Date: Jul. 27, 2011

(87) PCT Pub. No.: WO2010/087197
PCT Pub. Date: Aug. 5, 2010

(65) Prior Publication Data
US 2011/0296275 A1    Dec. 1, 2011

(30) Foreign Application Priority Data

Jan. 30, 2009   (JP) .................................. 2009-020864

(51) Int. Cl.
*H04L 1/18* (2006.01)
(52) U.S. Cl.
USPC .......................................... 714/748; 370/332
(58) Field of Classification Search
USPC .................................. 714/748, 751; 370/332
See application file for complete search history.

(56) References Cited

U.S. PATENT DOCUMENTS

| 6,516,435 | B1 | 2/2003 | Tsunoda | |
|---|---|---|---|---|
| 7,447,148 | B2* | 11/2008 | Gao et al. | 370/216 |
| 7,801,181 | B2* | 9/2010 | Song et al. | 370/478 |
| 7,995,462 | B2* | 8/2011 | Gao et al. | 370/216 |
| 8,108,756 | B2* | 1/2012 | Ganga et al. | 714/775 |
| 2003/0207696 | A1 | 11/2003 | Willenegger | |

(Continued)

FOREIGN PATENT DOCUMENTS

| JP | 11/136220 | 5/1999 |
|---|---|---|
| JP | 2005/525032 | 8/2005 |

(Continued)

OTHER PUBLICATIONS

International Search Report dated Mar. 30, 2010.

(Continued)

*Primary Examiner* — Esaw Abraham
(74) *Attorney, Agent, or Firm* — Dickinson Wright PLLC

(57) ABSTRACT

A wireless reception apparatus (200) for a wireless communication system which transmits, between an MBS transmission apparatus and MBS reception apparatus, multiple transport blocks (TB) coded by error correction coding at the physical layer or at both the physical layer and the data link layer. In the wireless reception apparatus (200), a feedback condition judgment unit (208) transmits feedback information to the MBS transmission apparatus when a reception judgment unit (206) detects errors in L or more TBs out of an N-number of TBs (N is a natural number while L is a natural number less than N) that constitute the beginning portion of any MAC FEC blocks where the beginning TB has been identified. In the wireless communication apparatus (100), the link adaptation unit (114), based on the feedback information from the wireless communication apparatus (200), adjusts the physical layer transmission parameters used for the TBs in the physical layer processing unit.

7 Claims, 21 Drawing Sheets

(56) References Cited

U.S. PATENT DOCUMENTS

| | | |
|---|---|---|
| 2005/0147040 A1 | 7/2005 | Vayanos |
| 2005/0210355 A1 | 9/2005 | Itoh |
| 2006/0013168 A1 | 1/2006 | Agrawal |
| 2008/0130534 A1* | 6/2008 | Tomioka ........................ 370/310 |
| 2009/0125778 A1 | 5/2009 | Uchida |

FOREIGN PATENT DOCUMENTS

| | | |
|---|---|---|
| JP | 2005/269480 | 9/2005 |
| JP | 2006/303793 | 11/2006 |
| JP | 2007/503740 | 2/2007 |
| JP | 2008/502220 | 1/2008 |
| JP | 2008/124613 | 5/2008 |
| JP | 20081141372 | 6/2008 |
| WO | 2007/069406 | 6/2007 |

OTHER PUBLICATIONS

K. Stanwood, et al., "Option outer-coded date made for MBS," IEEE 802.16 Broadband Wireless Access Working Group, IEEE C802.16maint-08/293, Sep. 9, 2011, pp. 1-16.

* cited by examiner

| INDEX REPRESENTING MCS | N | L |
|---|---|---|
| 1 | N1 | L1 |
| 2 | N2 | L2 |
| .. | .. | .. |

FIG. 8

WIRELESS ERROR CORRECTING TRANSMISSION APPARATUS, AND ERROR CORRECTING TRANSMISSION DATA FORMATION METHOD

TECHNICAL FIELD

The present invention relates to a wireless transmission apparatus, a wireless reception apparatus, a transmission data formation method, and a data reception method.

BACKGROUND ART

Application of MBS (Multicast Broadcast Service) is studied or started in various wireless communication systems (for example, 3GPP, WiMAX, and the like). The contents in MBS include streaming distribution or the like, and further higher capacity as well as higher quality is required in the future.

As a method for improving quality of MBS, first, there is an application of link adaptation based on feedback (FB) information from a reception side. As shown in FIG. 1, a terminal (MS) receives packet data of MBS (hereinafter "MBS packet data") transmitted from a base station (BS), determines whether or not the reception of the receiving packet is successfully performed, and feeds back information of reception success/failure determination result (ACK/NACK information) to the base station.

The BS variably controls a coding rate, a M-ary modulation value, a transmission power, and the like when transmitting an MBS packet next time and after that on the basis of a plurality of FB information pieces transmitted from a plurality of MSs in a communication area. The BS appropriately performs control (specifically, link adaptation) so that MBS in the communication area has a required quality. By this means, it is possible to secure a required quality of MBS in the communication area and suppress allocation of resources generating excessive quality, and as a result, the frequency use efficiency can be improved.

Here, the reception success/failure determination performed by MS is performed by using, for example, CRC (Cyclic Redundancy Check) added to each transport block (TB) in the physical layer. If the reception success/failure determination result of an MBS packet is reception OK (that is, a case in which ACK determination is made), ACK information is transmitted from MS to BS. On the other hand, if the reception success/failure determination result is reception NG (that is, a case in which NACK determination is made), NACK information is transmitted. The ACK information and the NACK information are transmitted through a predetermined common or individual uplink channel.

When such FB information is used, if there are a large number of terminals in a cell, the amount of FB information is huge, and thereby there is a problem that the frequency use efficiency in the uplink is degraded. To solve the problem, a method for reducing the amount of FB information is proposed. For example, as shown in FIG. 2, the amount of FB can be reduced by feeding back FB information only when NACK determination is made (hereinafter may be simply referred to as "NACK FB"). Further, a method is proposed in which a certain condition (FB condition) is further set and NACK information is fed back only when the condition is satisfied even when NACK determination is made. For example, first, there is a method in which terminals in a cell are divided into a plurality of terminal groups and a limited time window is set for each terminal group to transmit FB information. Second, there is a method for providing a call probability, that is, a method in which each terminal uses random numbers and when a random number satisfies a predetermined condition, feedback can be performed.

As a second method for improving quality of MBS, there is a method in which error correction code in the MAC layer (hereinafter may be simply referred to as "MAC FEC") is introduced (for example, see NPL 1, PTL 1, and PTL 2). In this method, in addition to error correction coding processing in the PHY layer, error correction coding processing is also performed in the MAC layer after interleave processing is performed on a plurality of TBs in the PHY layer. Specifically, dual coding processing over a plurality of TBs in the PHY layer is performed. By this means, a reception side MS can correct an error in TB in the PHY layer (hereinafter may be simply referred to as "PHY TB") by performing error correction decoding processing in the MAC layer. As a result, reception quality in MS is improved. A coder that performs error correction coding processing in the MAC layer may be referred to as inner coder, and a coder that performs error correction coding processing in the PHY layer may be referred to as outer coder.

CITATION LIST

Patent Literature

PTL 1
International Patent Publication No. 2007/069406
PTL 2
Japanese Patent Application Laid-Open No. 2008-124613

Non-Patent Literature

NPL 1
IEEE C802.16maint-08/293, "Optional outer-coded data mode for MBS" (Ken Stanwood, Yoav Nebat, Lei Wang, Erik Colban, Yair Bourlas; 2008-09-11)

SUMMARY OF INVENTION

Technical Problem

Meanwhile, it is considered that quality of MBS can be further improved by combining the first and second methods, that is, by employing link adaptation based on MAC FEC and NACK FB information. However, such method has not been proposed yet.

An object of the present invention is to provide a wireless transmission apparatus, a wireless reception apparatus, a transmission data formation method, and a data reception method which employ link adaptation based on an error correction code and feedback information in a second layer higher than or equal to a first layer included in the physical layer.

Solution to Problem

An aspect of a wireless transmission apparatus of the present invention is a wireless transmission apparatus that transmits data coded by error correction coding in, respectively, a first layer included in a physical layer and a second layer higher than or equal to the physical layer. The wireless transmission apparatus includes a second layer coding means that codes a transmission data series by a coding unit in the second layer and divides coded data into a plurality of data units, an identification information addition means that adds identification information for identifying a coding unit in the second layer to each data unit, and a first layer processing means that includes error correction coding for coding the data unit to which the identification information is added by a coding unit in the first layer.

An aspect of a wireless reception apparatus of the present invention is a wireless reception apparatus that receives data coded by error correction coding in, respectively, a first layer included in a physical layer and a second layer higher than or equal to the physical layer. The wireless reception apparatus includes a first layer decoding means that performs decoding processing on each data unit coded by error correction coding in the first layer and outputs a plurality of data units, an error detection means that detects presence or absence of decoding error in the data unit outputted from the first layer decoding means, a coding unit detection means that detects data unit coded by error correction coding in the second layer from the data unit decoded normally, and a feedback information generation means that generates feedback information of reception acknowledgement response on the basis of a detection result of the coding unit detection means and a detection result of the error detection means.

An aspect of a transmission data formation method of the present invention is a transmission data formation method that forms transmission data coded by error correction coding in, respectively, a first layer included in a physical layer and a second layer higher than or equal to the physical layer. The transmission data formation method includes a step that codes a transmission data series by a coding unit in the second layer and divides coded data into a plurality of data units, a step that adds identification information for identifying a coding unit in the second layer to each data unit, and a step that includes error correction coding for coding the data unit to which the identification information is added by a coding unit in the first layer.

An aspect of a data reception method of the present invention is a data reception method that receives data coded by error correction coding in, respectively, a first layer included in a physical layer and a second layer higher than or equal to the physical layer. The data reception method includes a first layer decoding step that performs decoding processing on each data coded by error correction coding in the first layer and outputs a plurality of data units, an error detection step that detects presence or absence of decoding error in the data unit outputted by the first layer decoding step, a coding unit detection step that detects data unit coded by error correction coding in the second layer from the data unit decoded normally; and a feedback information generation step that generates feedback information of reception acknowledgement response on the basis of a detection result of the coding unit detection step and a detection result of the error detection step.

Advantageous Effects of Invention

According to the present invention, it is possible to provide a wireless transmission apparatus, a wireless reception apparatus, a transmission data formation method, and a data reception method which employ link adaptation based on an error correction code and feedback information in a second layer higher than or equal to a first layer included in the physical layer.

BRIEF DESCRIPTION OF DRAWINGS

FIG. 8 is a diagram showing a table associating MCS information, N, and L;

DESCRIPTION OF EMBODIMENTS

The inventors found that the problem described below occurs when simply employing only the link adaptation based on MAC FEC and NACK FB information.

Figure 1:
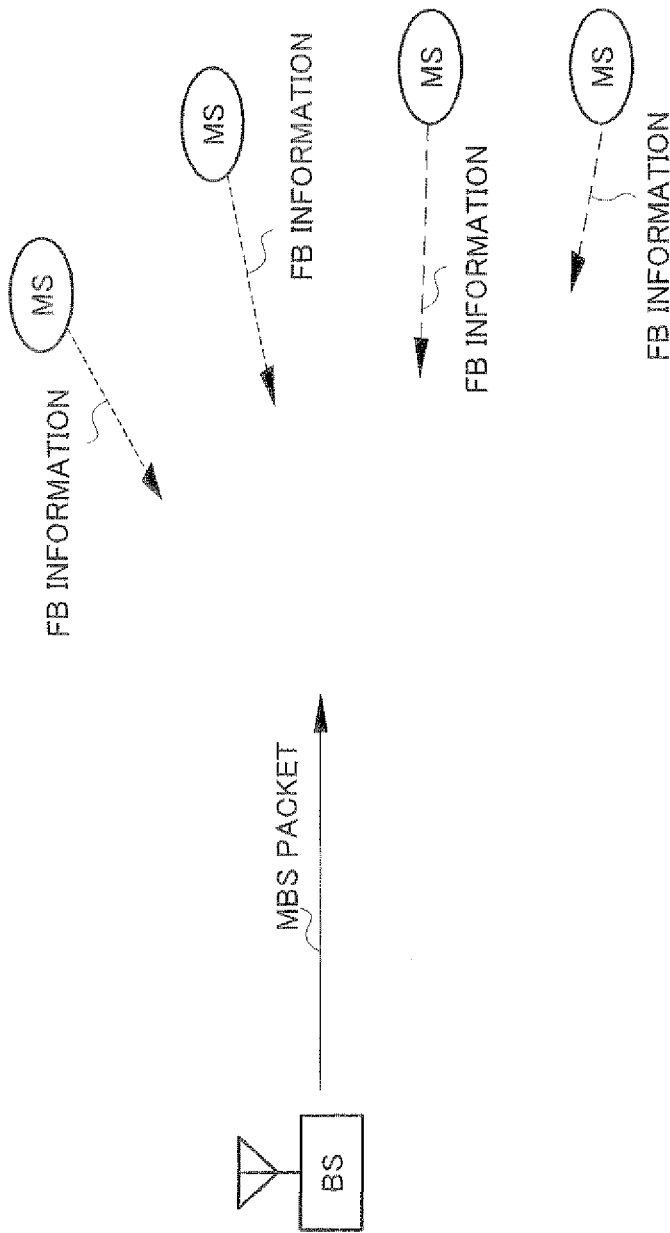
FIG. 1 is a diagram provided for explaining link adaptation based on feedback (FB) information from a reception side.
Figure 2:
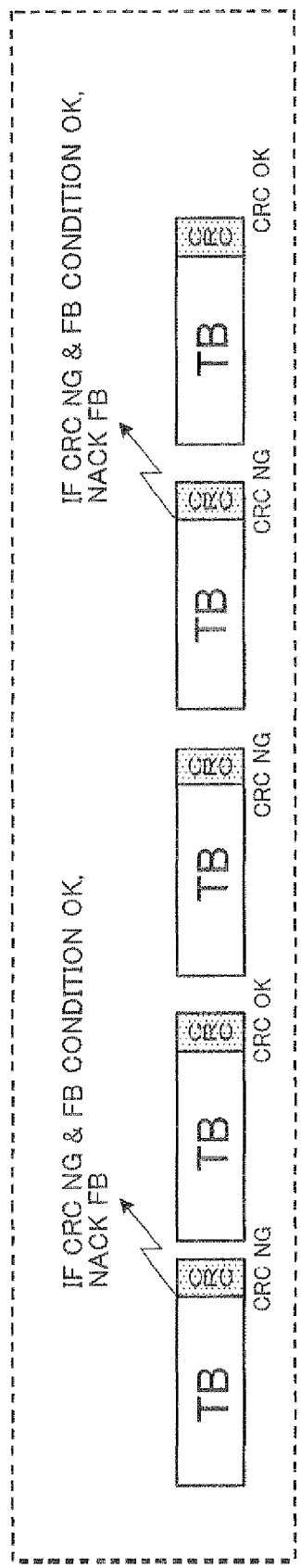
FIG. 2 explains feedback method for feeding back the FB information only when NACK determination is made.
Figure 3:
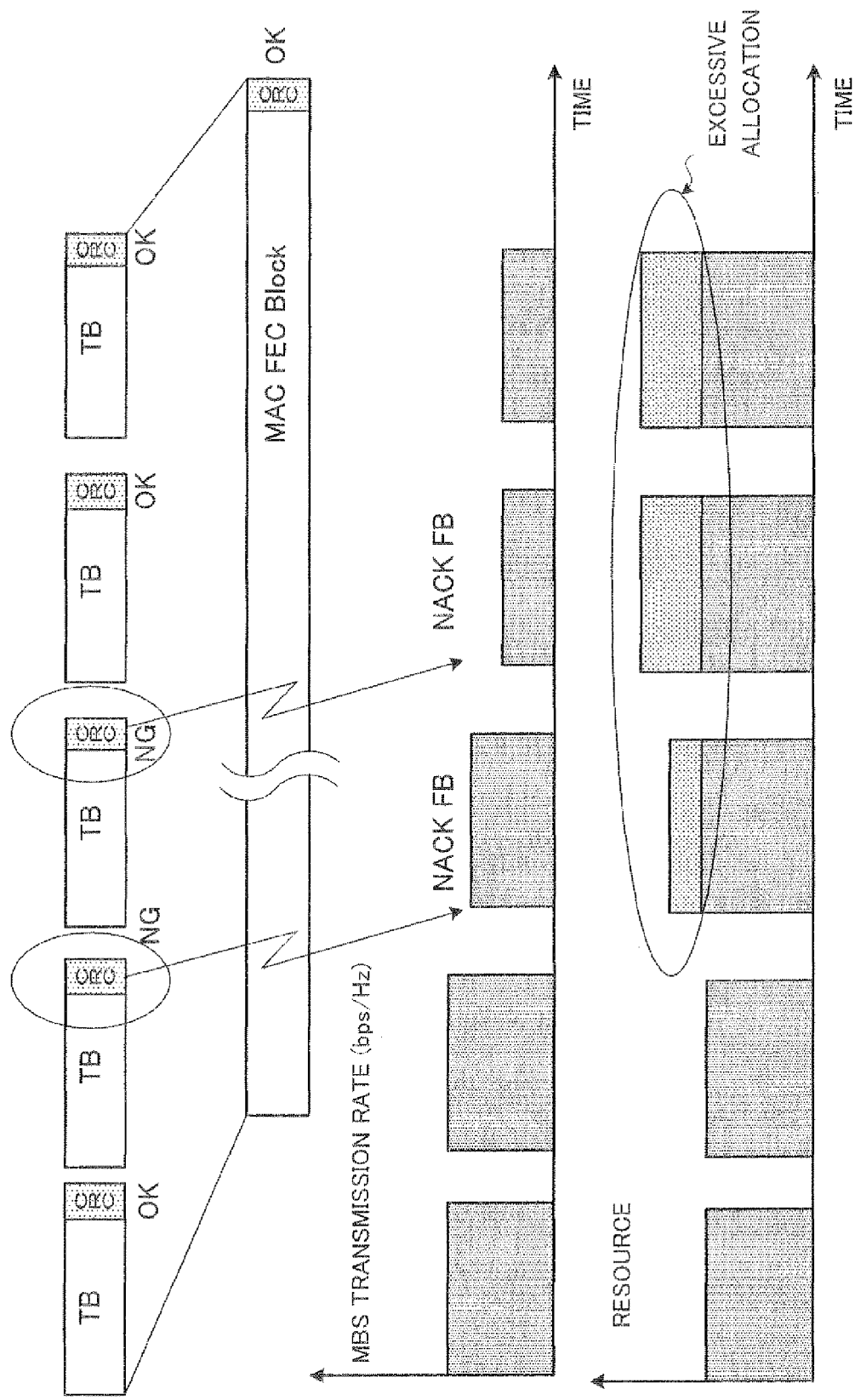
FIG. 3 explains problem occurring when link adaptation based on MAC FEC and NACK FB information is employed.

Even when some of PHY TBs included in a coding unit (that is, MAC FEC block) of MAC FEC are reception NG, some of the PHY TBs may be reception OK due to error correction effect of MAC FEC. However, even in such a case, the error correction effect of MAC FEC is not considered in NACK FB in a PHY TB unit, so NACK FB in the PHY layer may be performed (see FIG. 3). By this means, when MCS is set by the link adaptation, MCS whose quality is higher than a required quality is set. As a result, the probability in which resources are excessively assigned to an MBS packet increases.

Figure 4:
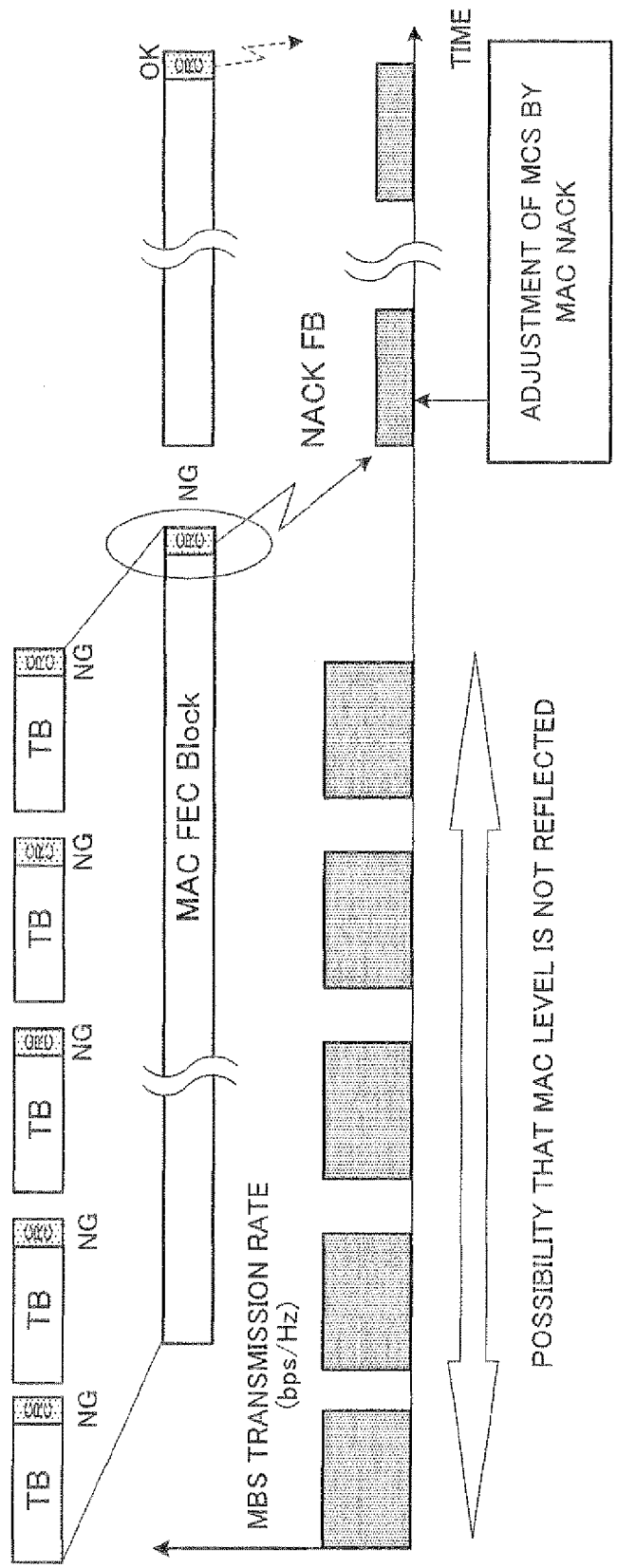
FIG. 4 explains problem occurring when link adaptation based on MAC FEC and NACK FB information is employed.

On the other hand, it is possible to perform NACK FB in a coding unit (MAC FEC block) in MAC FEC. However, in this case, the MAC level based on NACK FB is reflected to a subsequent MAC FEC block unit (see FIG. 4). Therefore, the MAC level reflection to MCS by the link adaptation delays, so there is an MAC FEC block that cannot obtain a characteristic improvement effect expected from employment of MAC FEC. When such a phenomenon occurs, the longer the size of the MAC FEC block is, the lower the frequency use efficiency is.

In view of these problems, the inventors have reached the present invention.

Hereinafter, embodiments of the present invention will be described with reference to the drawings. In Embodiments, the same constituent elements will be given by the same reference numerals, and thus, the redundant descriptions thereof will be omitted.

Embodiment 1

Figure 5:
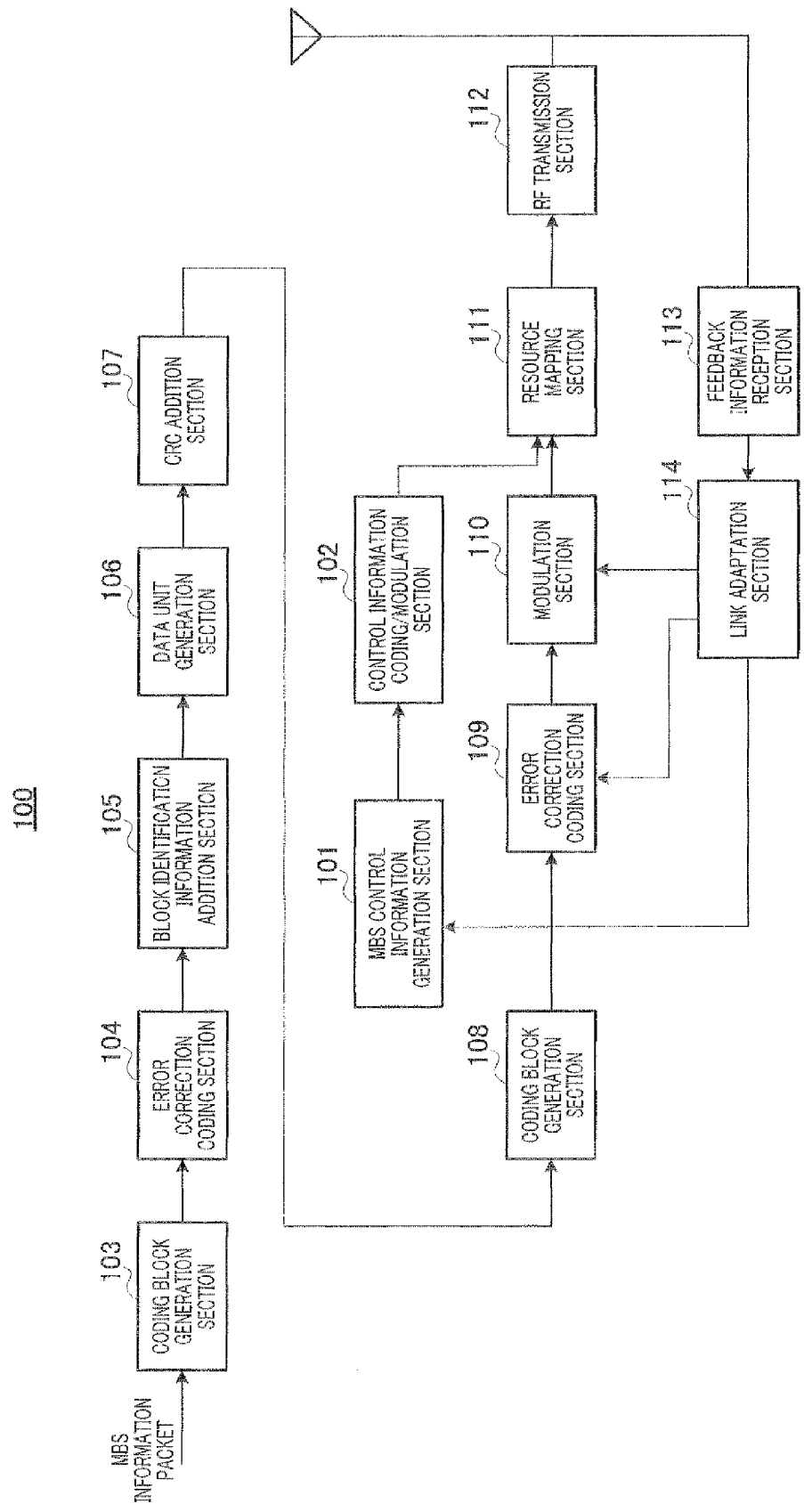
FIG. 5 is a block diagram showing a configuration of a wireless communication apparatus (MBS transmission side) according to Embodiment 1 of the present invention.

FIG. 5 is a block diagram showing a configuration of wireless communication apparatus 100 according to Embodiment of the present invention. In FIG. 5, wireless communication apparatus 100 as an MBS transmission apparatus includes MBS control information generation section 101, control information coding/modulation section 102, coding block generation section 103, error correction coding section 104, block identification information addition section 105, data unit generation section 106, CRC addition section 107, coding block generation section 108, error correction coding section 109, modulation section 110, resource mapping section 111, RF transmission section 112, feedback information reception section 113, and link adaptation section 114.

MBS control information generation section 101 generates an MBS control information packet including control information, such as resource allocation information of MBS data, MCS (Modulation and coding scheme) information indicating a coding rate of error correction coding section 109 and a M-ary modulation value in modulation section 110, a data size, a coding block size of error correction coding section 109, resource allocation information used by wireless communication apparatus 200 described below to transmit feedback information to wireless communication apparatus 100, and the like.

Control information coding/modulation section 102 uses the MBS control information packet generated by MBS control information generation section 101 as an input to perform error correction coding processing and modulation processing on the MBS control information packet by using a predetermined M-ary modulation value and coding rate.

Coding block generation section 103 uses an MBS information packet as an input. The MBS information packet is formed from, for example, an IP packet group outputted from the network layer (see upper part in FIG. 6). Coding block generation section 103 adds a header including control information to the front of each packet of inputted IP packet group. Coding block generation section 103 has a buffer (not shown in the drawings) and stores packets to which headers are added within a range in which the size of information stored in the buffer is equal to a first coding block size of error correction coding section 104 in the next stage or the size of the information does not exceeds the first coding block size. If the size of the information does not become equal to the first coding block size, coding block generation section 103 performs padding on the entire packet group stored in the buffer until the size of the information becomes equal to the first coding block size, and outputs the entire packet group, the size of which becomes equal to the first coding block size, to the error correction coding section 104 (see the second row in FIG. 6). In this way, information having the first coding block size can be inputted into error correction coding section 104. In coding block generation section 103, it is possible to add processing for storing the MBS information packet into the buffer after performing interleave processing which changes the order of bit information included in the MBS information packet. In this case, an effect occurs in which a burst error caused by a packet error is changed to a random error by performing the interleave processing, and thus a coding gain of error correction coding section 104 can be increased.

Figure 6:
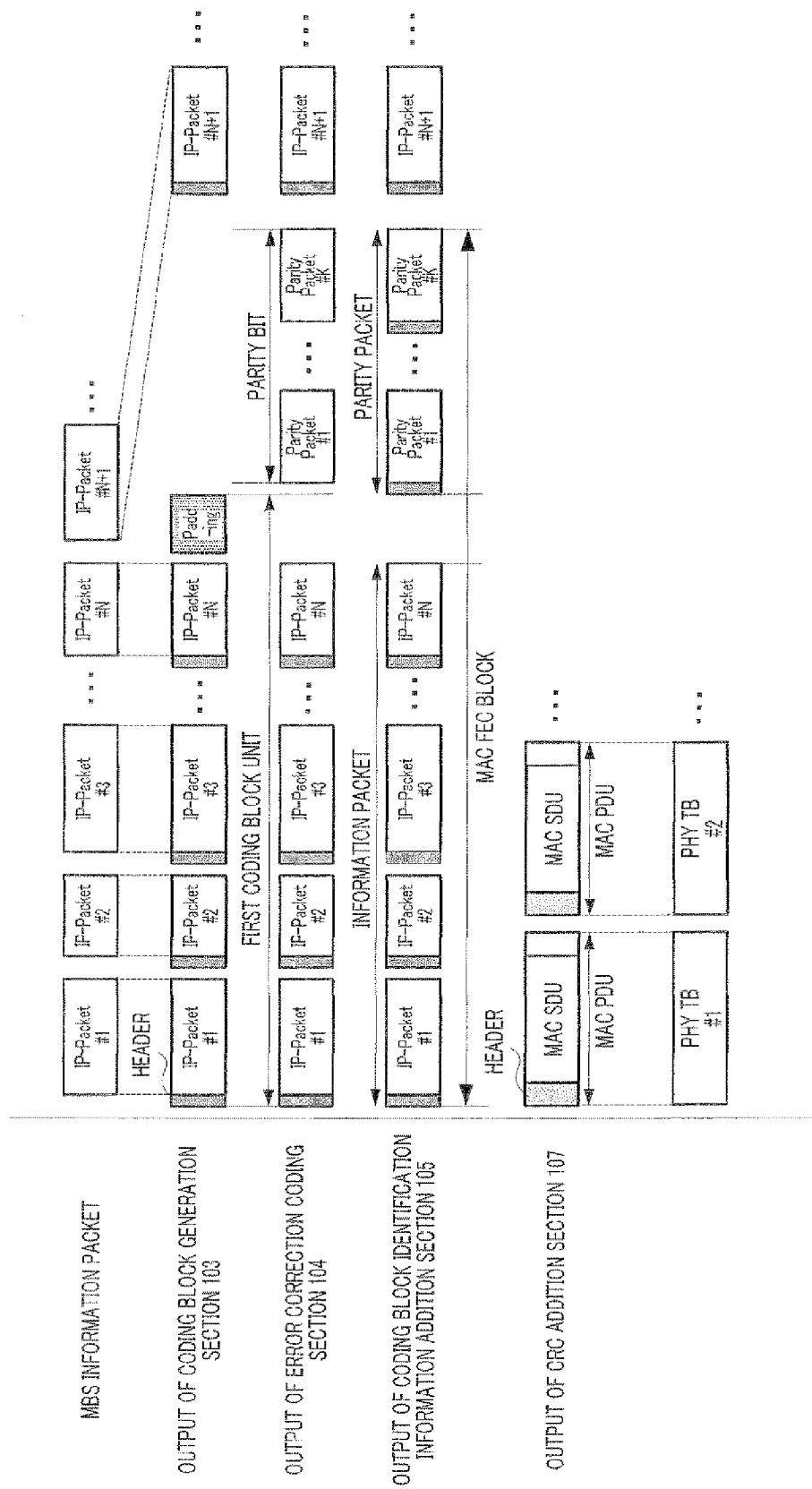
FIG. 6 is a diagram provided for explaining processing of functional sections in the wireless communication apparatus in FIG. 5.

Error correction coding section 104 forms the first coding block generated by coding block generation section 103 into an error correction code as one coding unit. Here, for example, systematic code is used. Also, here, error correction coding section 104 belongs to, for example, the MAC layer. First, error correction coding section 104 outputs the inputted first coding block as a systematic bit series without change (see the third row in FIG. 6). If padding bits are added in coding block generation section 103, it is possible to include processing for deleting the padding bits (depadding processing). In FIG. 6, an example in which the depadding processing is added is shown. Second, error correction coding section 104 divides a parity bit series obtained by forming the inputted first coding block into an error correction code into predetermined sizes, and outputs a plurality of partial series obtained by this processing as a parity packet group (see the third row in FIG. 6).

Block identification information addition section 105 adds identification information for each unit (hereinafter referred to as MAC FEC block) of the MBS information packet group (corresponding to systematic bit series) outputted from error correction coding section 104 by forming the first coding block into an error correction code as one coding unit and the parity packet group, and serial number information provided to each packet in the MAC FEC block unit, as header information (see the fourth row in FIG. 6).

For example, when N MBS information packets and K parity packets are included in the MAC FEC block, as the serial number information, block identification information addition section 105 adds serial numbers 1 to N+K respectively to the packets included in the MAC FEC block unit as header information. Block identification information addition section 105 adds identification information with bit information alternately inverted for each MAC FEC block unit to each packet of a plurality of continuous input MAC FEC block units as identification information for each MAC FEC block unit. For example, 0, 1, 0, and 1 are respectively added to the MBS information packets and the parity packet groups included in the first to the fourth MAC FEC blocks as the identification information. The identification information is included in the header information of the packets included in each MAC FEC block. Although, here, an example of adding identification information of 1 bit to each MAC FEC block is described, it is not limited to this, but identification information may be formed by using many bits. Or, packets (one packet such as the front packet or a plurality of packets) included in a specific portion of the packets included in a MAC FEC block may be provided with identification information different from that of packets included in a portion other than the specific portion. For example, identification information "1" is added to a packet corresponding to the front portion of the packet group included in a MAC FEC block, and identification information "0" is added to packets of the other portion.

Data unit generation section 106 generates a plurality of data units from the MAC FEC block outputted from block identification information addition section 105. In this generation processing, in order to cause the data units to have a predetermined size (data unit size), fragmentation processing for dividing constituent packets included in a MAC FEC block to generate a plurality of divided packets or packing processing for combining a plurality of constituent packets included in a MAC FEC block to generate a combined packet, and processing for adding predetermined control information to the packets generated by the fragmentation processing or the packing processing are performed.

CRC addition section 107 adds CRC to each data unit as error detection information so that a reception side of the data unit generated by data unit generation section 106 can detect an error for each data unit (see the fifth row in FIG. 6). Hereinafter, each data unit to which CRC is added by CRC addition section 107 may be referred to as a physical layer transport block (PHY TB).

Coding block generation section 108 divides PHY TB that is an output of CRC addition section 107 into second coding block size units of error correction coding section 109 in the next stage. The second coding block size is instructed by link adaptation section 114. Here, the second coding block size is smaller than the first coding block size. When dividing PHY TB into a plurality of partial blocks, if a partial block smaller than the second coding block size is obtained, padding bits are added to the partial block.

Error correction coding section 109 forms the second coding block generated by coding block generation section 108 into an error correction code as one coding unit. The coding rate of the error correction coding processing is instructed by link adaptation section 114.

Modulation section 110 converts a code data series obtained by error correction coding section 109 into a symbol data series based on a set M-ary modulation value and forms a modulation signal for each symbol data. The M-ary modulation value to be used in modulation section 110 is instructed by link adaptation section 114.

Resource mapping section 111 maps a modulation signal including an MBS control information packet received from control information coding/modulation section 102 on a resource defined by a predetermined time and frequency. Also, resource mapping section 111 maps a modulation signal including an MBS information packet received from modulation section 110 on a resource defined by a time and frequency instructed by resource allocation information included in the MBS information packet.

RF transmission section 112 converts an output signal of resource mapping section 111 which is a baseband signal, into a high-frequency signal of wireless carrier frequency band, and transmits the obtained wireless signal via an antenna.

Feedback information reception section 113 receives feedback information transmitted from wireless communication apparatus 200 described below, performs reception wireless processing such as down convert, analog-digital conversion, and the like, and then outputs the feedback information to link adaptation section 114.

Link adaptation section 114 controls the M-ary modulation value to be used in modulation section 110 or the coding rate of error correction coding section 109 on the basis of the feedback information received from feedback information reception section 113. The M-ary modulation value and the coding rate set by link adaptation section 114 are notified to wireless communication apparatus 200 described below via MBS control information generation section 101.

Figure 7:
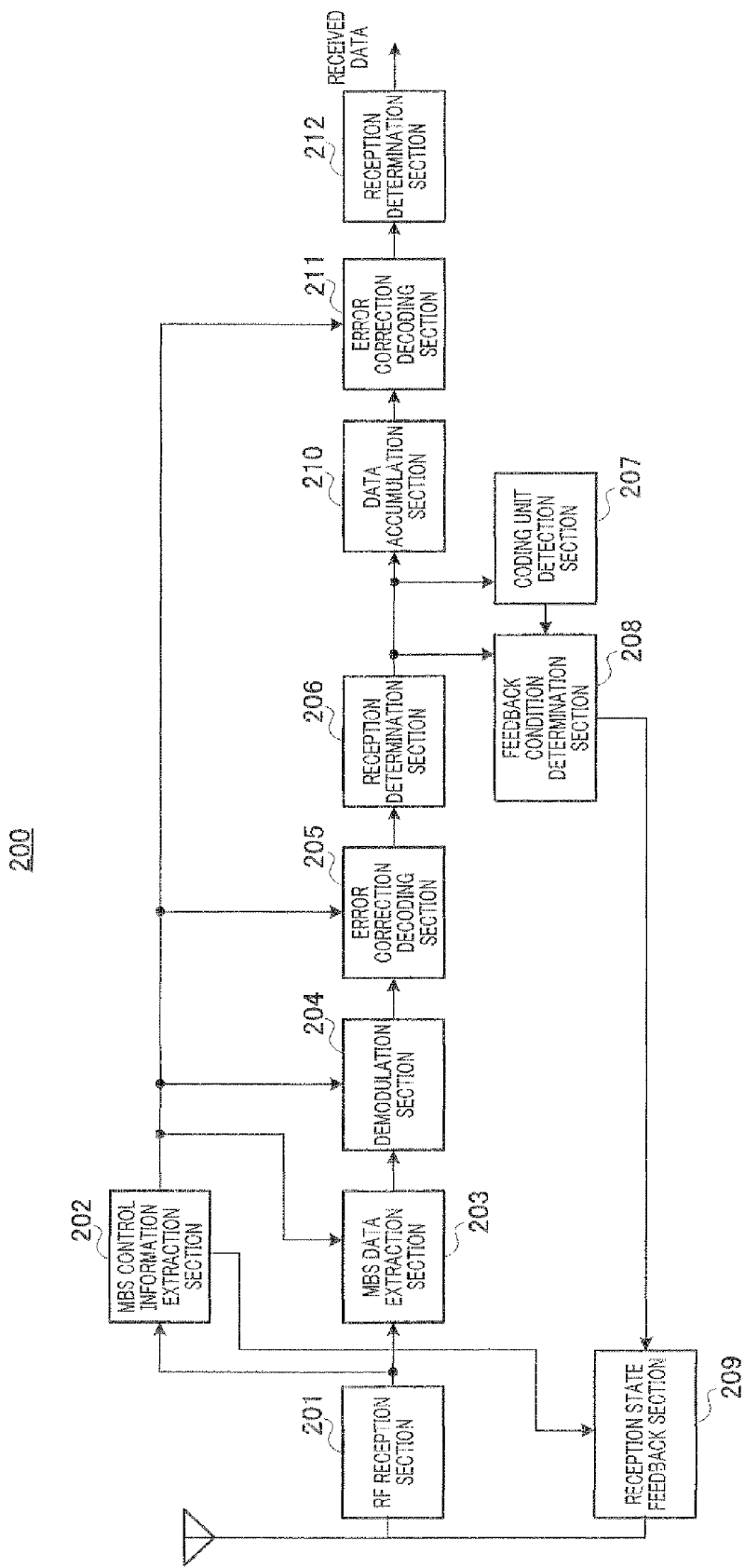
FIG. 7 is a block diagram showing a configuration of a wireless communication apparatus (MBS reception side) according to Embodiment 1 of the present invention.

FIG. 7 is a block diagram showing a configuration of wireless communication apparatus 200 according to Embodiment 1 of the present invention. In FIG. 7, wireless communication apparatus 200 as an MBS reception apparatus includes RF reception section 201, MBS control information extraction section 202, MBS data extraction section 203, demodulation section 204, error correction decoding section 205, reception determination section 206, coding unit detection section 207, feedback condition determination section 208, reception state feedback section 209, data accumulation section 210, error correction decoding section 211, and reception determination section 212.

RF reception section 201 receives a signal transmitted from wireless communication apparatus 100, performs reception wireless processing such as down convert, analog-digital conversion, and the like on the reception signal, and then outputs the reception signal to MBS control information extraction section 202, and MBS data extraction section 203.

MBS control information extraction section 202 extracts an MBS control information packet from the reception signal. Specifically, MBS control information extraction section 202 extracts control information, such as the resource allocation information of MBS data, the coding rate of error correction coding section 104, the MCS (Modulation and coding scheme) information indicating the coding rate of error correction coding section 109 and the M-ary modulation value in modulation section 110, the data size, the second coding block size, the resource allocation information used to transmit feedback information from wireless communication apparatus 200 to wireless communication apparatus 100, and the like included in the MBS control information packet. The extracted control information is outputted to MBS data extraction section 203, demodulation section 204, error correction decoding section 205, and error correction decoding section 211.

MBS data extraction section 203 extracts the MBS information packet from the reception signal on the basis of the resource allocation information of MBS data and the data size received from MBS control information extraction section 202.

Demodulation section 204 demodulates the MBS information packet extracted by MBS data extraction section 203 on the basis of the MCS information and the data size received from MBS control information extraction section 202. By this demodulation processing, symbol data is converted into bit data.

Error correction decoding section 205 performs error correction decoding of bit data series received from demodulation section 204. The decoding processing performed by error correction decoding section 205 makes a pair with the coding processing performed by error correction coding section 109. Therefore, the decoding processing performed by error correction decoding section 205 is performed on the basis of the coding rate included in the MCS information and the second coding block size received from MBS control information extraction section 202. Decoding result units obtained for each second coding block in error correction decoding section 205 are outputted to reception determination section 206.

Reception determination section 206 detects whether a plurality of decoding result units received from error correction decoding section 205 are normally received or not by using CRC added to each PHY TB unit.

Coding unit detection section 207 extracts first coding block identification information and serial number information included in PHY TB that is received normally, and detects the position of the PHY TB in the MAC FEC block. Therefore, in coding unit detection section 207, success and failure of reception for each PHY TB included in a given MAC FEC block, and the front PHY TB in a given MAC FEC block are identified.

Figure 8:
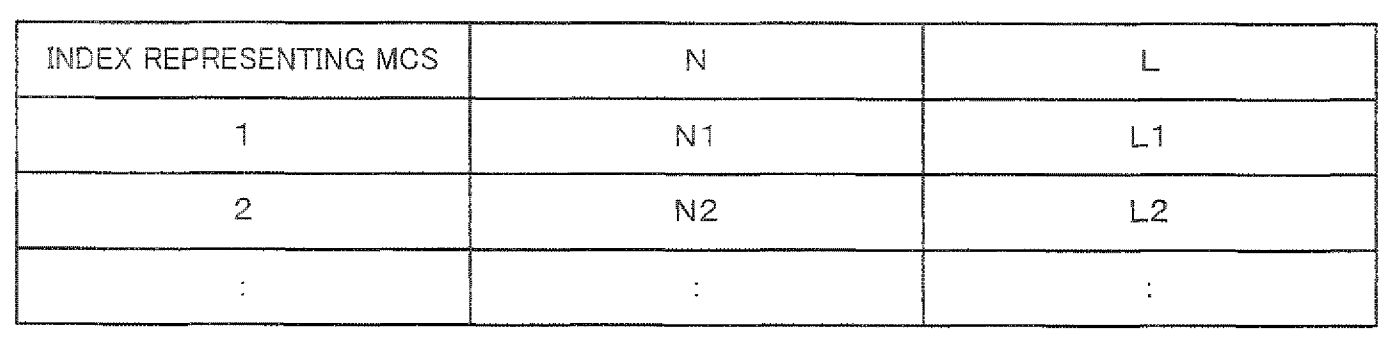

Feedback condition determination section 208 determines whether the feedback condition (that is, the condition that determines whether or not the reception state is fed back to wireless communication apparatus 100) is satisfied or not on the basis of the detection result of coding unit detection section 207. The feedback condition is that an error is detected in a predetermined number L or more of PHY TBs among N PHY TBs included in the front portion of a MAC FEC block whose front PITY TB is identified. When the feedback condition is satisfied, feedback condition determination section 208 outputs a reception acknowledgement response of NACK (reception NG). Here, N and L are determined considering a coding gain by the error correction coding in error correction coding section 109. L is a natural number smaller than or equal to N. As the feedback condition, a value previously known by wireless communication apparatus 100 and wireless communication apparatus 200 may be used or a fixed value may be used. The values of N and L may be variable by using a table associating MCS information, N, and L as shown in FIG. 8.

When feedback condition determination section 208 determines that the feedback condition is satisfied, reception state feedback section 209 transmits feedback information to wireless communication apparatus 100. The feedback information is transmitted by a resource indicated by the resource allocation information which is received from MBS control information extraction section 202 and used to transmit feedback information. As the feedback information, the reception acknowledgement response of NACK (reception NG) is transmitted. By doing so, it is possible to reduce the amount of feedback information when there are a plurality of wireless communication apparatus 200. It is all right that feedback condition determination section 208 determines whether or not the feedback condition is satisfied in the same manner as described above and reception state feedback section 209 transmits the reception acknowledgement response of NACK (reception NG) when the feedback condition is not satisfied and transmits the reception acknowledgement response of ACK (reception OK) when the feedback condition is satisfied.

Data accumulation section 210 accumulates PHY TBs while extracting the first coding block identification information and the serial number information included in PHY TBs and sorting the PHY TBs in the order of the serial numbers. Data accumulation section 210 accumulates PHY TBs until all the PHY TBs included in a MAC FEC block are accumulated, and outputs the MAC FEC block as a unit to error correction decoding section 211.

Error correction decoding section 211 performs error correction decoding of a data string received from data accumulation section 210. The decoding processing performed by error correction decoding section 211 makes a pair with the coding processing performed by error correction coding section 104. Therefore, the decoding processing performed by error correction decoding section 211 is performed for each MAC FEC block on the basis of the coding rate of error correction coding section 104 received from MBS control information extraction section 202.

Reception determination section 212 detects whether a MAC FEC block is normally received or not by using error detection information such as CRC.

Figure 9:
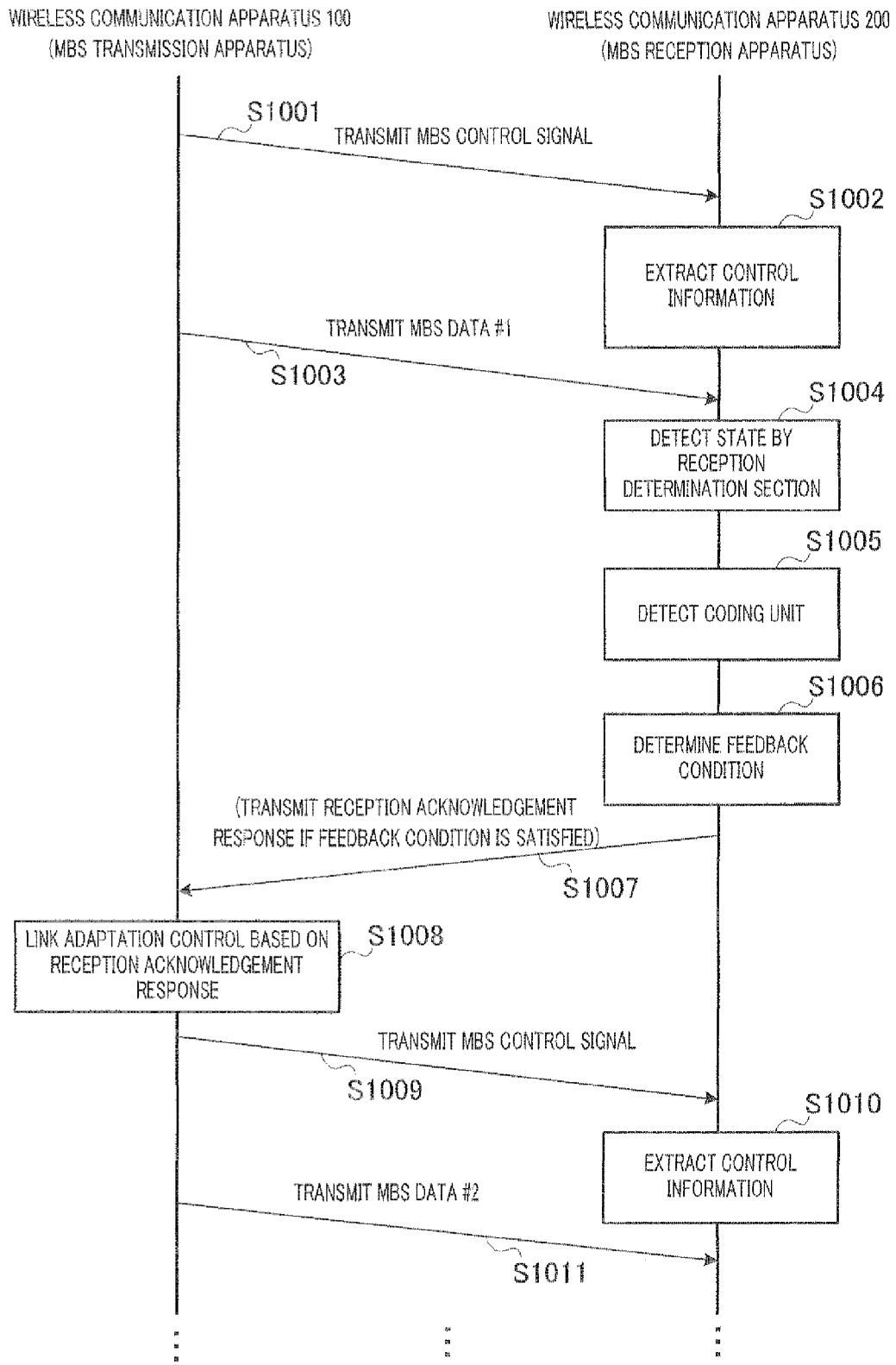
FIG. 9 is a diagram provided for explaining operations of the wireless communication apparatus (MBS transmission side) and the wireless communication apparatus (MBS reception side) according to Embodiment 1 of the present invention.

Next, operations of wireless communication apparatus 100 and wireless communication apparatus 200 having the configurations described above will be described. FIG. 9 is a diagram provided for explaining operations of wireless communication apparatus 100 and wireless communication apparatus 200.

In step S1001, wireless communication apparatus 100 transmits an MBS control signal to wireless communication apparatus 200.

In step S1002, MBS control information extraction section 202 of wireless communication apparatus 200 extracts an MBS control information packet from the reception signal. Wireless communication apparatus 200 can receive MBS data transmitted from wireless communication apparatus 100 next time by using control information included in the MBS control information packet.

In step S1003, wireless communication apparatus 100 transmits MBS data #1 to wireless communication apparatus 200.

The MBS data #1 received by wireless communication apparatus 200 is processed by processing described in RF reception section 201, MBS data extraction section 203, demodulation section 204, and error correction decoding section 205, and then outputted from error correction decoding section 205 to reception determination section 206 as an decoding result unit.

In step S1004, reception determination section 206 detects a reception state. Specifically, reception determination section 206 detects whether a plurality of decoding result units received from error correction decoding section 205 are normally received or not by using CRC added to each PHY TB unit.

In step S1005, coding unit detection section 207 detects a coding unit. Specifically, coding unit detection section 207 extracts first coding block identification information and serial number information included in PHY TB that is received normally, and detects the position of the PHY TB in the MAC FEC block. By this means, in coding unit detection section 207, success and failure of reception for each PHY TB included in a given MAC FEC block, and the front PHY TB in a given MAC FEC block are identified.

In step S1006, feedback condition determination section 208 determines whether the feedback condition is satisfied or not on the basis of the detection result of coding unit detection section 207.

If the feedback condition is satisfied, in step S1007, feedback condition determination section 208 transmits the reception acknowledgement response to wireless communication apparatus 100.

The reception acknowledgement response received by wireless communication apparatus 100 is inputted into link adaptation section 114 via feedback information reception section 113.

In step S1008, link adaptation section 114 controls the M-ary modulation value to be used in modulation section 110 or the coding rate of error correction coding section 109 on the basis of the reception acknowledgement response received from feedback information reception section 113. Specifically, link adaptation section 114 reduces the M-ary modulation value and reduces the coding rate of error correction coding section 109 when receiving the reception acknowledgement response of NACK (reception NG).

Figure 10:
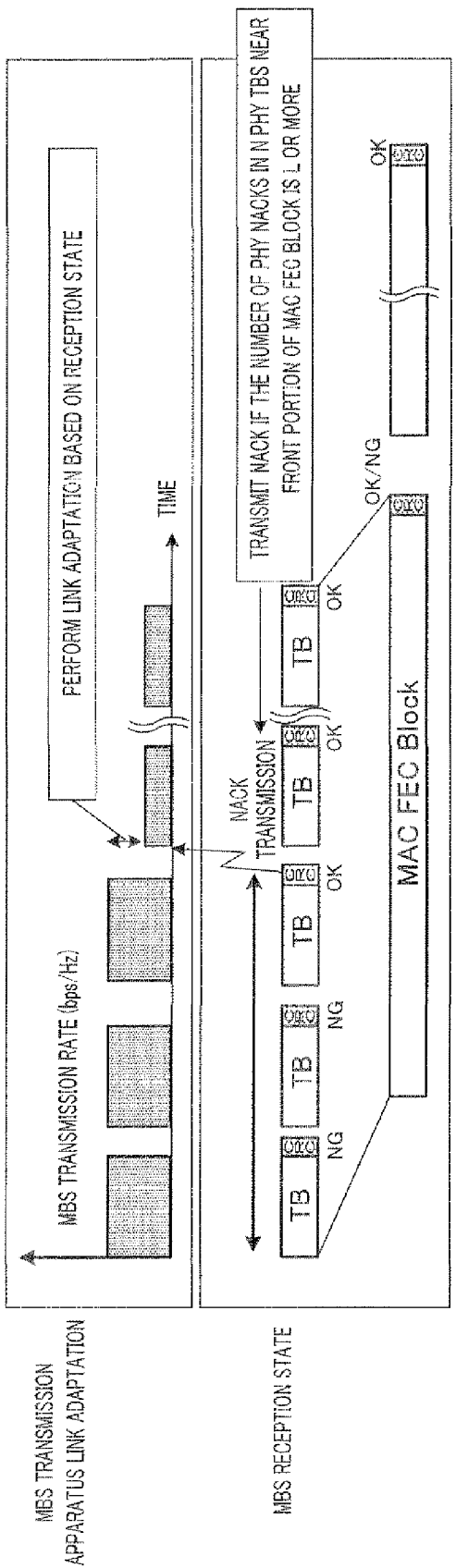
FIG. 10 is a diagram provided for explaining operations of the wireless communication apparatus (MBS transmission side) and the wireless communication apparatus (MBS reception side) according to Embodiment 1 of the present invention.

Here, as shown in FIG. 10, the feedback condition is determined at the timing when the error detection processing of N PHY TBs included in the front portion of the MAC FEC block is completed without waiting for the timing when the error detection processing of the entire MAC FEC block is completed. The feedback information is transmitted to wireless communication apparatus 100 at this timing, so adjustment of MCS can be performed at an early timing. Further, by setting the values of N and L that are parameters of the feedback condition so that the error correction result of the entire MAC FEC block matches the feedback condition at a high degree of accuracy, the accuracy of MCS adjusted in wireless communication apparatus 100 is guaranteed. In summary, NACK FB considering the error correction result of MAC FEC can be performed at a timing when the error correction result of MAC FEC is first obtained, so that it is possible to adjust MCS accurately at an appropriate timing. As a result, the reception success probability of MAC FEC block can be improved, so that it is possible to improve the frequency usage efficiency. Further, the feedback to wireless communication apparatus 100 needs not be performed for each PHY TB, so that it is possible to reduce the amount of feedback information.

Referring again to FIGS, in step S1009, wireless communication apparatus 100 transmits the MBS control signal including the coding rate and the M-ary modulation value which have been adjusted, to wireless communication apparatus 200.

In step S1010, MBS control information extraction section 202 of wireless communication apparatus 200 extracts an MBS control information packet from the reception signal. Wireless Communication apparatus 200 can receive MBS data transmitted from wireless communication apparatus 100 next time by using control information included in the MBS control information packet.

In step S1011, wireless communication apparatus 100 transmits MBS data #2 to wireless communication apparatus 200 by the coding rate and the M-ary modulation value which have been adjusted.

As described above, according to the present embodiment, in wireless reception apparatus 200 of a wireless communication system which transmits a plurality of transport blocks (TBs) coded by error correction coding in both the physical layer (PHY layer) and the data link layer (MAC layer) between the MBS transmission apparatus and the MBS reception apparatus, when reception determination section 206 detects errors in L or more TBs (L is a natural number smaller than N) among N TBs (N is a natural number) included in the front portion in a given code word block (here, MAC FEC block) in which the front TB is identified, feedback condition determination section 208 transmits the feedback information to the MBS transmission apparatus.

By doing so, NACK FB considering the error correction result of MAC FEC can be performed at a timing when the error correction result of MAC FEC is first obtained, it is possible to adjust MCS accurately at an appropriate timing. As a result, the reception success probability of MAC FEC block can be improved, so that it is possible to improve the frequency usage efficiency. Further, the feedback to the MBS transmission apparatus need not be performed for each PHY TB, so that it is possible to reduce the amount of feedback information.

In wireless communication apparatus 100, error correction coding section 104 codes a transmission data series (here, MBS information packet) by a coding unit (here, first coding block) in the MAC layer, data unit generation section 106 divides a code word block (here, MAC FEC block) obtained by error correction coding section 104 for each coding unit into a plurality of data units, a PHY layer processing section (that is, from CRC addition section 107 to RF transmission section 112) forms TB based on a data unit, and link adaptation section 114 adjusts PHY layer transmission parameters used for TB in the PHY layer processing section on the basis of the feedback information from wireless communication apparatus 200. The PHY layer transmission parameters are the M-ary modulation value and the coding rate in Embodiment 1.

In the above description, the feedback condition is that an error is detected in a predetermined number L or more of PHY TBs among N PHY TBs included in the front portion of a MAC FEC block whose front PHY TB is identified. However, the present invention is not limited to this, and the feedback condition may be that an error is detected in a predetermined number L or more of PHY TBs among N PHY TBs included in the middle portion other than the front portion and the rear portion in a MAC FEC block. In short, the feedback condition may be that an error is detected in a predetermined number L or more of PHY TBs among N PHY TBs included in a partial block except for the rear portion in a MAC FEC block.

In the above description, a case in which the error correction coding is performed in both the physical layer (PHY layer) and the data link layer (MAC layer) is described. Specifically, error correction coding section 104 and error correction coding section 109 respectively perform the error correction coding processing in the MAC layer and the PHY layer. However, the present invention is not limited to this, and both error correction coding section 104 and error correction coding section 109 may perform the error correction coding processing in the PHY layer, or error correction coding section 104 may perform in a layer higher than the MAC layer and error correction coding section 109 may perform the error correction coding processing in the PHY layer. In short, the error correction coding processing may be performed in both a first layer included in the physical layer and a second layer higher than or equal to the first layer and lower than the network layer (IP layer).

Embodiment 2

In embodiment 2, by feeding back the error correction detection result for each MAC FEC block, the link adaptation is performed based on the feedback information and the first feedback condition described above is adjusted.

Figure 11:
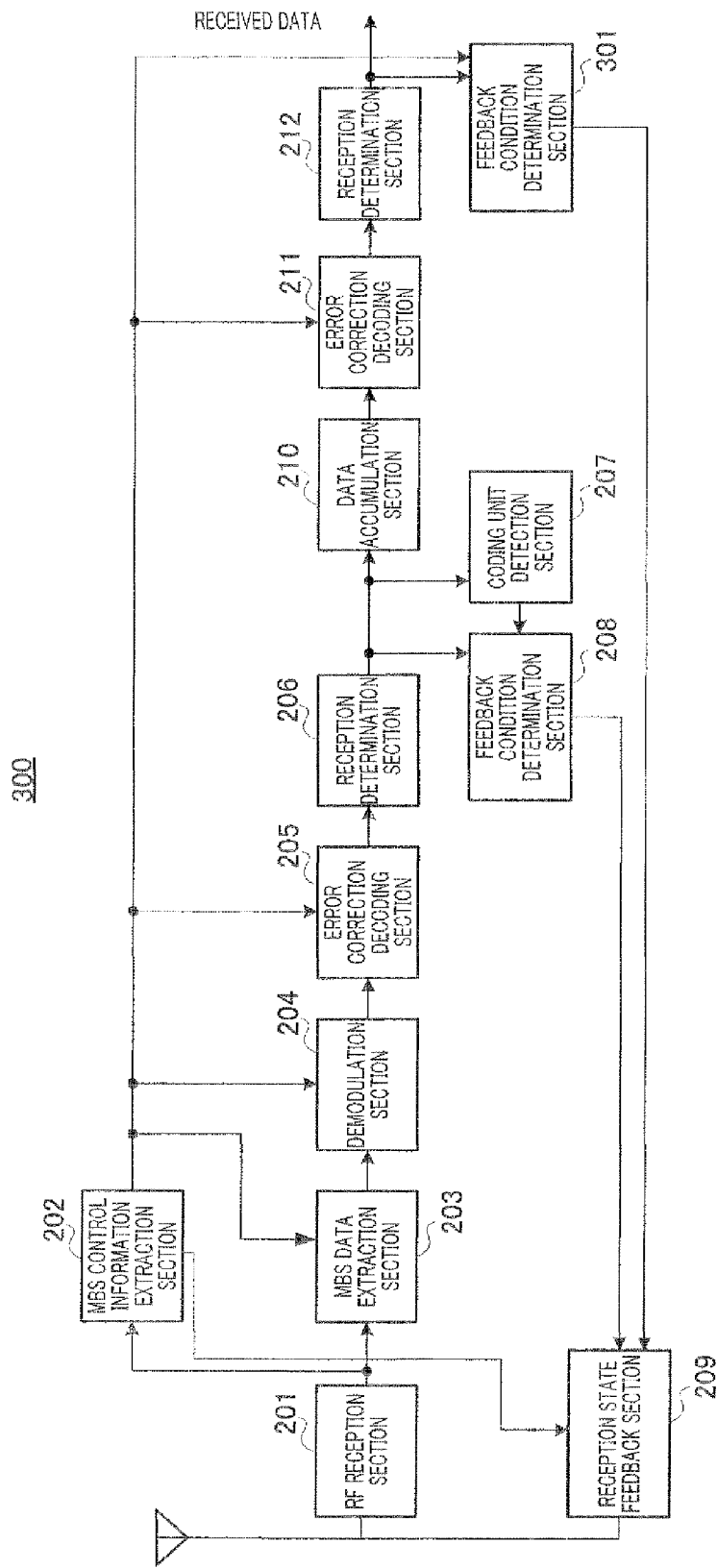
FIG. 11 is a block diagram showing a configuration of a wireless communication apparatus (MBS reception side) according to Embodiment 2 of the present invention.

FIG. 11 is a block diagram showing a configuration of wireless communication apparatus 300 according to Embodiment 2 of the present invention. In FIG. 11, wireless communication apparatus 300 as the MBS reception apparatus has feedback condition determination section 301.

First, in wireless communication apparatus 300, MBS control information extraction section 202 has the same function as that in Embodiment 1. However, in Embodiment 2, the MBS control information extracted by MBS control information extraction section 202 includes information related to a first feedback condition (condition used by feedback condition determination section 208) and information related to a second feedback condition (condition used by feedback condition determination section 301) in addition to the control information described in Embodiment 1. The resource allocation information used to transmit the feedback information includes resource allocation information of first feedback information transmitted when the first feedback condition is satisfied and resource allocation information of second feedback information transmitted when the second feedback condition is satisfied.

Feedback condition determination section 208 has the same function as that in Embodiment 1. However, as described above, there is a case in which the MBS control information includes the first feedback condition adjusted by wireless communication apparatus 400 described below on the basis of the feedback information transmitted the previous time, and in this case, feedback condition determination section 208 performs determination using the feedback condition that has been adjusted.

Feedback condition determination section 301 determines whether the second feedback condition is satisfied or not on the basis of the error detection result of reception determination section 212. First, feedback condition determination section 301 uses an initial value as the second feedback condition. Thereafter, as described above, there is a case in which the MBS control information includes the second feedback condition adjusted by wireless communication apparatus 400 described below on the basis of the second feedback information transmitted the previous time, and in this case, feedback condition determination section 301 performs determination using the feedback condition that has been adjusted. The second feedback condition is, for example, that an error is detected in the MAC FEC block by reception determination section 212. When this condition is used, even if an error is detected in the MAC FEC block, the feedback may not be always performed, but may be performed with a fixed probability. By doing so, the amount of feedback can be reduced. As the second feedback condition, it is possible to use information indicating whether the feedback is allowed or not which is notified from wireless communication apparatus 400 described below.

When feedback condition determination section 208 determines that the first feedback condition is satisfied, reception state feedback section 209 transmits the first feedback information to wireless communication apparatus 400 described below. When feedback condition determination section 301 determines that the second feedback condition is satisfied, reception state feedback section 209 transmits the second feedback information to wireless communication apparatus 400 described below. The first and second feedback information are transmitted by a resource indicated by the resource allocation information which is received from MBS control information extraction section 202 and used to transmit the feedback information. As the feedback information, the reception acknowledgement response of NACK (reception NG) is transmitted. By doing so, it is possible to reduce the amount of feedback information when there are a plurality of wireless communication apparatus 400 described below. It is all right that feedback condition determination section 301 determines whether or not the second feedback condition is satisfied in the same manner as described above and reception state feedback section 209 transmits the reception acknowledgement response of NACK (reception NG) when the second feedback condition is not satisfied and transmits the reception acknowledgement response of ACK (reception OK) when the second feedback condition is satisfied.

Figure 12:
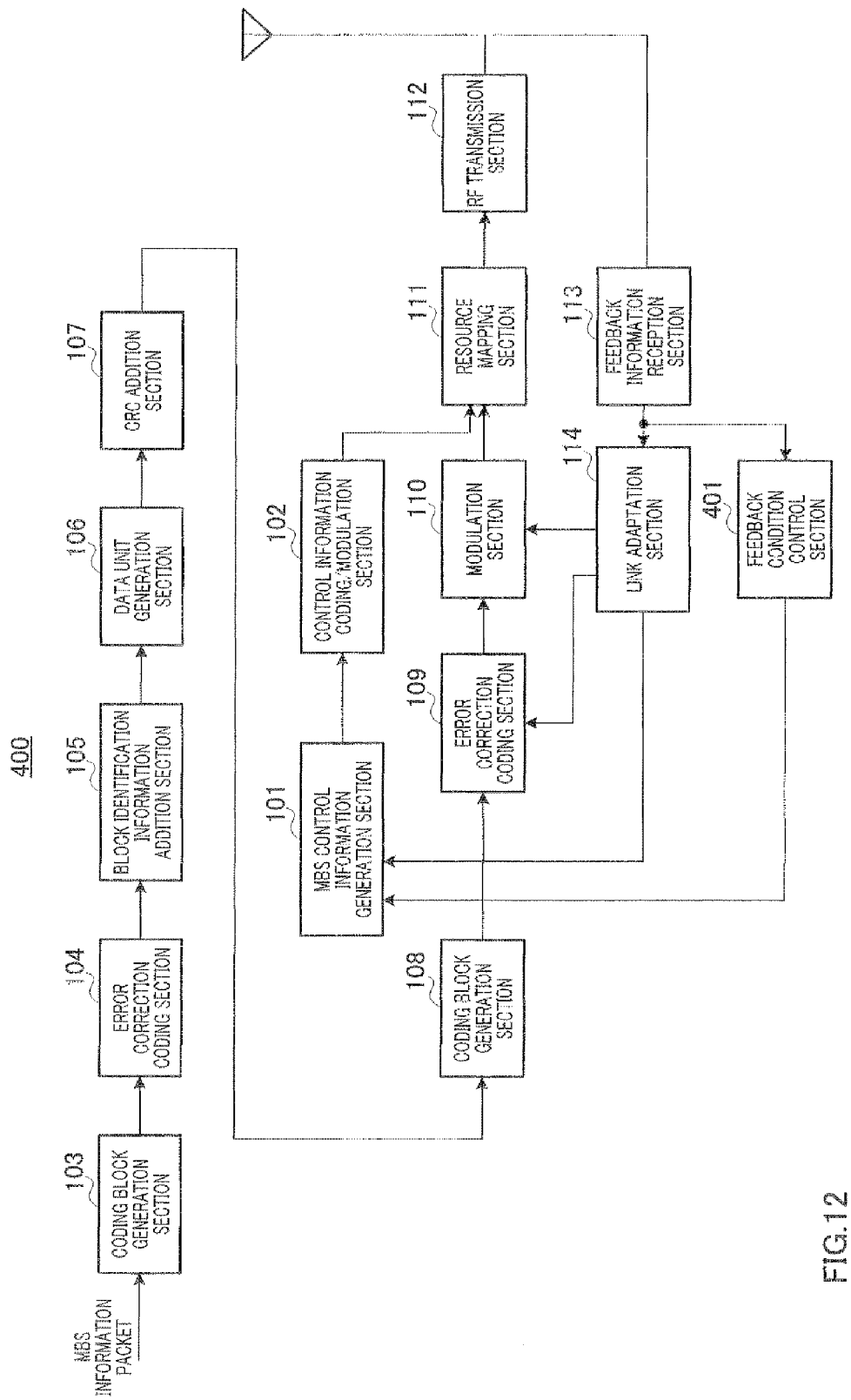
FIG. 12 is a block diagram showing a configuration of a wireless communication apparatus (MBS transmission side) according to Embodiment 2 of the present invention.

FIG. 12 is a block diagram showing a configuration of wireless communication apparatus 400 according to Embodiment 2 of the present invention. In FIG. 12, wireless communication apparatus 400 as the MBS transmission apparatus has feedback condition control section 401.

Feedback condition control section 401 controls the first feedback condition and the second feedback condition on the basis of the second feedback information received from feedback information reception section 113. When feedback condition control section 401 receives the second feedback information (that is, the reception acknowledgement response of NACK (reception NG)), feedback condition control section 401 performs control for changing the parameters (N, L) included in the first feedback condition.

Specifically, when feedback condition control section 401 receives the second feedback information (that is, the reception acknowledgement response of NACK (reception NG)), feedback condition control section 401 reduces the ratio (LIN) of a feedback determination threshold value (L) to a determination time period (N). By doing so, the feedback condition is alleviated. In other words, even when the number of errors detected in the PHY TB units is small, wireless communication apparatus 300 notifies wireless communication apparatus 400 of the first feedback information.

On the other hand, when feedback condition control section 401 does not receive the second feedback information (that is, the reception acknowledgement response of NACK (reception NG)), feedback condition control section 401 sets predetermined first and second feedback conditions. Whether the second feedback condition is satisfied or not, when the reception acknowledgement response of NACK (reception NG) is transmitted from reception state feedback section 209, feedback condition control section 401 controls the first feedback condition and the second feedback condition according to the content of the reception acknowledgement response in the same manner as the control content of feedback condition control section 401 described above.

Feedback condition control section 401 may apply a control for increasing or decreasing the feedback determination time period N. In this case, by increasing N, it is possible to increase the probability that the error correction result of the entire MAC FEC block matches the feedback condition. In other words, it is possible to improve error detection estimate accuracy for each MAC FEC block unit. However, if N is too large, being adversely affected, the timing of the link adaptation delays, so the maximum, value of N is determined by the size of the MAC FEC block.

Link adaptation section 114 controls the M-ary modulation value to be used in modulation section 110 or the coding rate of error correction coding section 109 on the basis of the second feedback information in addition to the first feedback information received from feedback information reception section 113.

MBS control information generation section 101 has the same function as that in Embodiment 1. However, in Embodiment 2, the MBS control information packet generated by MBS control information generation section 101 includes information related to the first feedback condition and information related to the second feedback condition in addition to the control information described in Embodiment 1.

Figure 13:
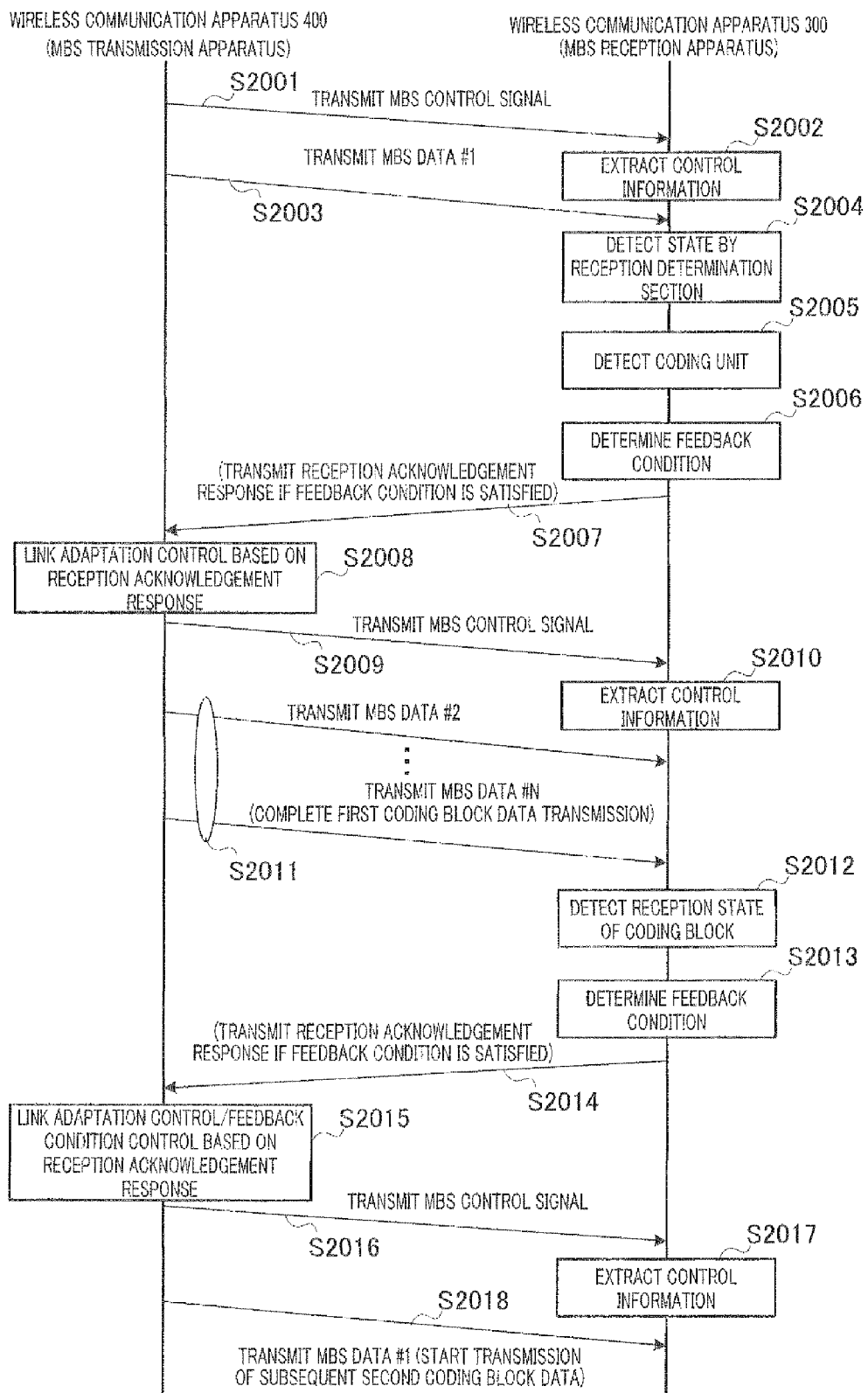
FIG. 13 is a diagram provided for explaining operations of the wireless communication apparatus (MBS transmission side) and the wireless communication apparatus (MBS reception side) according to Embodiment 2 of the present invention.

Next, operations of wireless communication apparatus 300 and wireless communication apparatus 400 having the configurations described above will be described. FIG. 13 is a diagram provided for explaining operations of wireless communication apparatus 300 and wireless communication apparatus 400. The operation from step S2001 to step S2011 in FIG. 13 is the same as the operation from step S1001 to step S1011 in FIG. 9, so the description thereof will be omitted.

By step S2011, the transmission of entire MAC FEC block is completed. When the reception of entire MAC FEC block is completed, the entire MAC FEC block is outputted from data accumulation section 210. Then, error correction decoding section 211 performs error correction decoding on the entire MAC FEC block received from data accumulation section 210 and outputs the decoding result to reception determination section 212.

In step S2012, reception determination section 212 detects a reception state. Specifically, reception determination section 212 detects whether or not the decoding result received from error correction decoding section 211 is normally received.

In step S2013, feedback condition determination section 301 determines whether the second feedback condition is satisfied or not on the basis of the detection result of reception determination section 212.

If the second feedback condition is satisfied, in step S2014, feedback condition determination section 301 transmits the reception acknowledgement response to wireless communication apparatus 400.

The reception acknowledgement response received by wireless communication apparatus 400 is inputted into link adaptation section 114 and feedback condition control section 401 via feedback information reception section 113.

In step S2015, link adaptation section 114 controls the M-ary modulation value to be used in modulation section 110 or the coding rate of error correction coding section 109 on the basis of the reception acknowledgement response (here, the second feedback information) received from feedback information reception section 113. Specifically, link adaptation section 114 reduces the M-ary modulation value and reduces the coding rate of error correction coding section 109 when receiving the reception acknowledgement response of NACK (reception NG).

Figure 14:
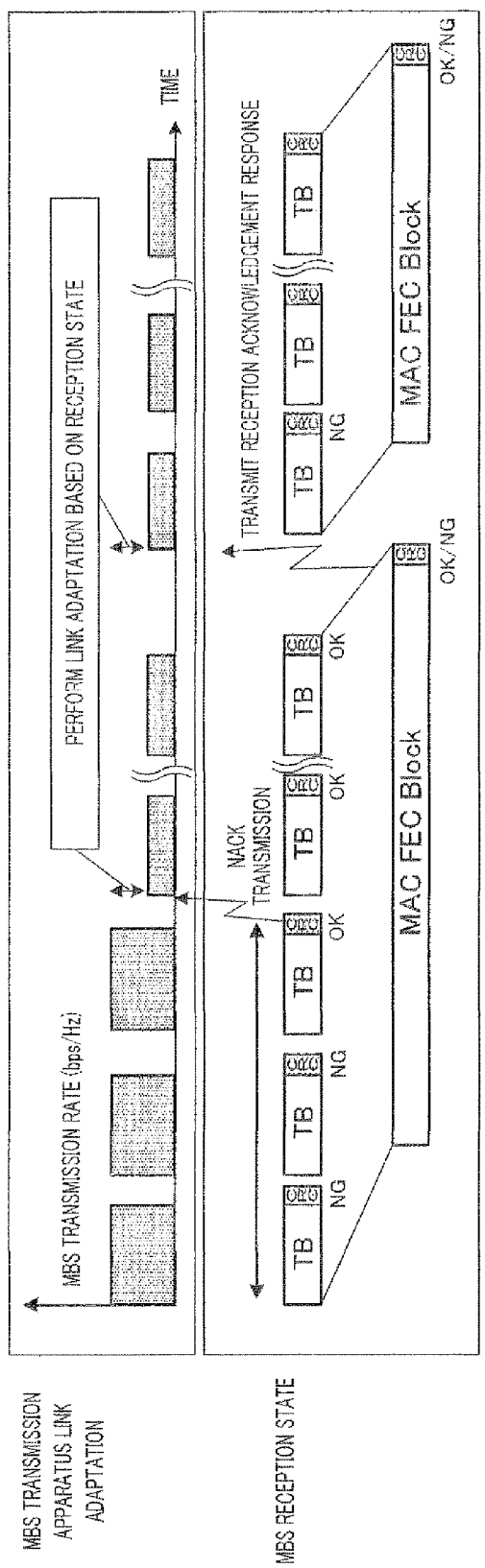
FIG. 14 is a diagram provided for explaining operations of the wireless communication apparatus (MBS transmission side) and the wireless communication apparatus (MBS reception side) according to Embodiment 2 of the present invention.

As described above, in Embodiment 2, the link adaptation is performed at the timing when the error correction result of the entire MAC FEC block is obtained (that is, the timing of determining the second feedback condition) in addition to the same timing as that in Embodiment 1 (that is, the timing of determining the first feedback condition) (see FIG. 14). By this means, more accurate link adaptation is realized.

In step S2015, feedback condition control section 401 adjusts the first feedback condition and the second feedback condition on the basis of the reception acknowledgement response (here, the second feedback information) received from feedback information reception section 113.

The coding rate, the M-ary modulation value, the first feedback condition, and the second feedback condition which have been adjusted in step S2015 are included in the MBS control signal and transmitted to wireless communication apparatus 300 in step S2016.

In step S2017, MBS control information extraction section 202 of wireless communication apparatus 300 extracts an MBS control information packet from the reception signal. Wireless communication apparatus 300 can receive MBS data transmitted from wireless communication apparatus 400 next time by using control information included in the MBS control information packet.

In step S2018, wireless communication apparatus 400 transmits MBS data #1 belonging to the next MAC FEC block to wireless communication apparatus 300 by the coding rate and the M-ary modulation value which have been adjusted.

As described above, according to the present embodiment, in wireless communication apparatus 400, error correction decoding section 211 decodes a plurality of decoding data units (here, decoding result units obtained by error correction decoding section 205 for each second coding block) for each code word block unit (here, MAC FEC block) and outputs a second decoding data unit, reception determination section 212 detects error of the second decoding data unit for each code word block unit, and feedback condition determination section 301 transmits the second feedback information when error is detected by reception determination section 212.

By doing so, the MBS transmission apparatus can perform link adaptation at the timing when the error correction result of the entire MAC FEC block is obtained (that is, the timing of determining the second feedback condition) in addition to the timing of determining the first feedback condition. By this means, more accurate link adaptation is realized.

In wireless communication apparatus 400, link adaptation section 114 adjusts. PHY layer transmission parameters used for TB in the PHY layer processing section on the basis of the first feedback information and the second feedback information from wireless communication apparatus 300. The PHY layer transmission parameters are the M-ary modulation value and the coding rate in Embodiment 1.

In wireless communication apparatus 400, when feedback condition control section 401 receives the second feedback information, feedback condition control section 401 adjusts N and L, which are parameters of feedback condition.

By doing so, the feedback condition can be appropriately adjusted according to the communication state, so that it is possible to adjust MCS more accurately.

In the above description, the first feedback condition is that an error is detected in a predetermined number L or more of PHY TBs among N PHY TBs included in the front portion of a MAC FEC block whose front PHY TB is identified. However, the present invention is not limited to this, and the feedback condition may be that an error is detected in a predetermined number L or more of PRY TBs among N PHY TBs included in the middle portion other than the front portion and the rear portion in a MAC FEC block. In short, the feedback condition may be that an error is detected in a predetermined number L or more of PHY TBs among N PHY TBs included in a partial block except for the rear portion in a MAC FEC block.

In the above description, a case in which the error correction coding is performed in both the physical layer (PHY layer) and the data link layer (MAC layer) is described. Specifically, error correction coding section 104 and error correction coding section 109 respectively perform the error correction coding processing in the MAC layer and the PHY layer. However, the present invention is not limited to this, and both error correction coding section 104 and error correction coding section 109 may perform the error correction coding processing in the PHY layer, or error correction coding section 104 may perform in a layer higher than the MAC layer and error correction coding section 109 may perform the error correction coding processing in the PHY layer. In short, the error correction coding processing may be performed in both a first layer included in the physical layer and a second layer higher than or equal to the first layer and lower than the network layer (IP layer).

Embodiment 3

In Embodiment 3, a mode in which two-stage coding processing including inner code coding and outer code coding is performed as described in Embodiment 1 and Embodiment 2 (two-stage coding mode) and a mode in which only outer code coding is performed without performing inner code coding (one-stage coding mode) are switched according to a data information size of the MBS information packet.

Figure 15:
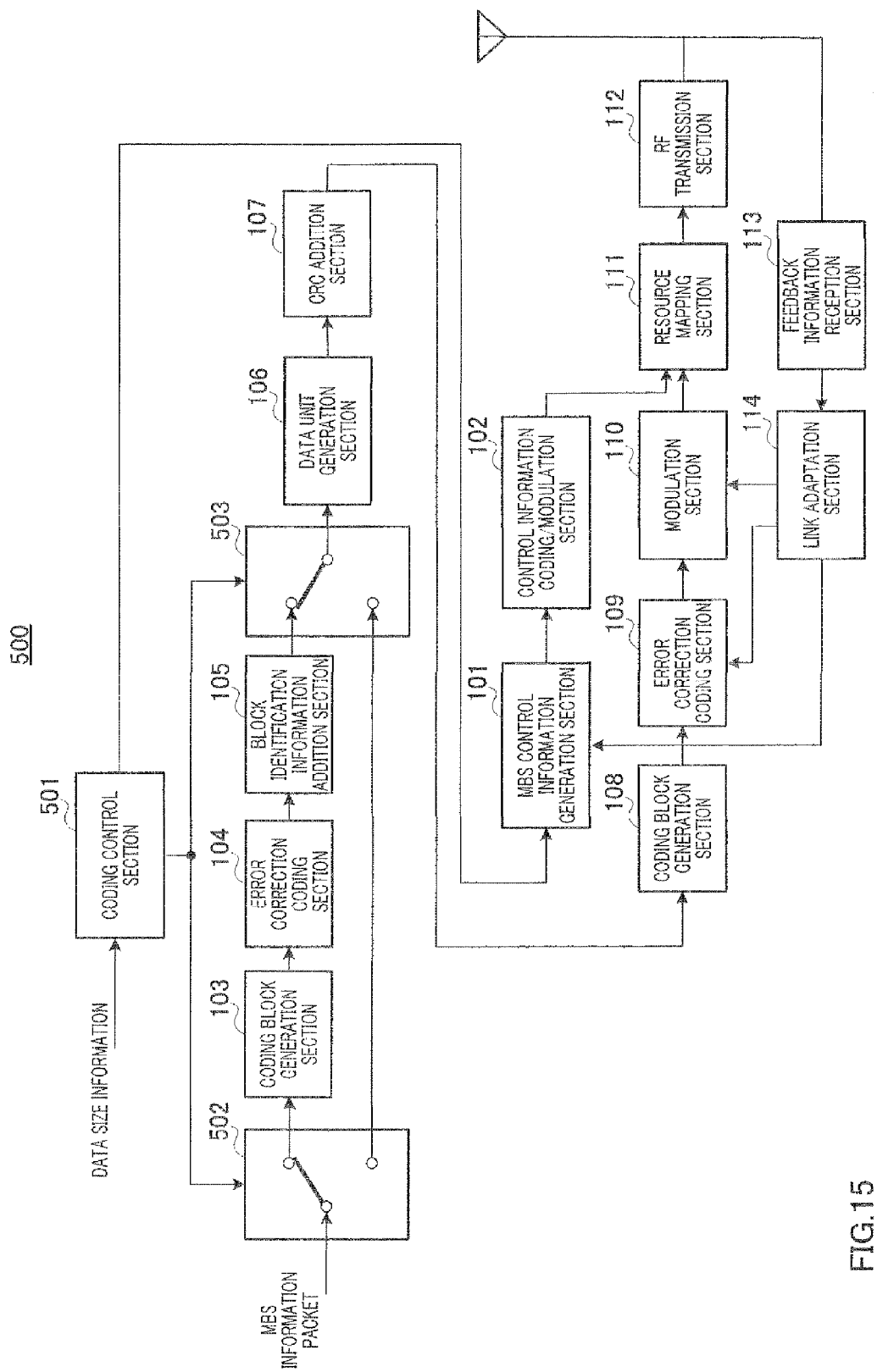
FIG. 15 is a block diagram showing a configuration of a wireless communication apparatus (MBS transmission side) according to Embodiment 3 of the present invention.

FIG. 15 is a block diagram showing a configuration of wireless communication apparatus 500 according to Embodiment 3 of the present invention. In FIG. 15, wireless communication apparatus 500 as the MBS transmission apparatus has coding control section 501 and switches 502 and 503.

Coding control section 501 switches the two-stage coding mode and one-stage coding mode according to a data information size of the MBS information packet. Specifically, coding control section 501 switches the coding mode to the one-stage mode when the data information size of the MBS packet is smaller than a predetermined size because there is a probability that a coding gain by the coding processing of error correction coding section 104 cannot be obtained when the data information size of the MBS packet is small. On the other hand, if the data information size of the MBS packet is a predetermined size, coding control section 501 switches the coding mode to the two-stage coding mode. The switching of the mode is performed by switching the state of switches 502 and 503.

Coding control section 501 outputs identification information of the selected mode to MBS control information generation section 101. By this means, coding mode identification information selected by wireless communication apparatus 500 is included in the MBS control information packet and transmitted.

Switches 502 and 503 switch a path of the MBS information packet between a first path passing through coding block generation section 103, error correction coding section 104, and block identification information addition section 105 and a second path directly connected to data unit generation section 106 without passing through coding block generation section 103, error correction coding section 104, and block identification information addition section 105 on the basis of a control signal from coding control section 501. The first path corresponds to the two-stage coding mode and the second path corresponds to the one-stage coding mode.

Figure 16:
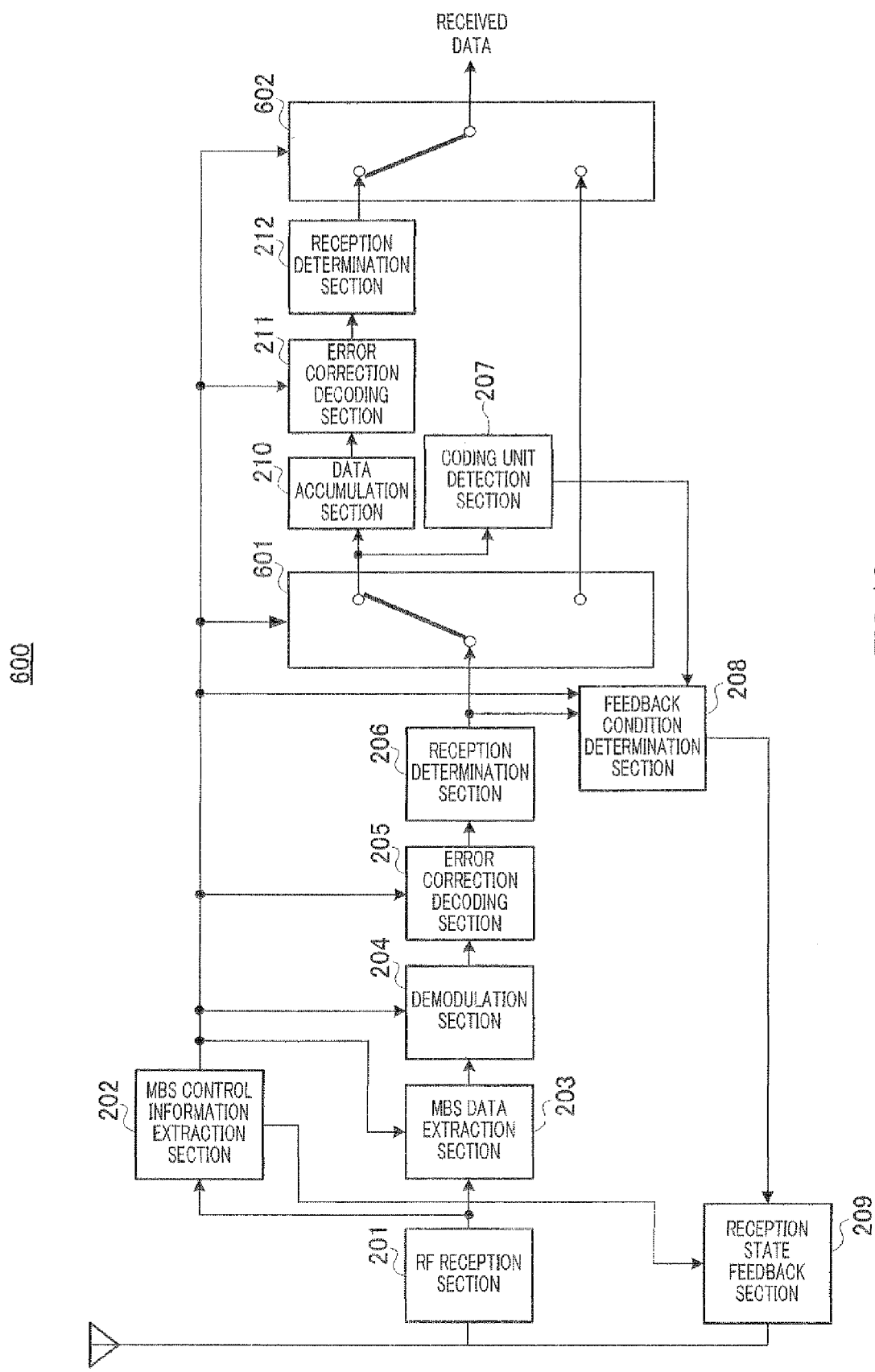
FIG. 16 is a block diagram showing a configuration of a wireless communication apparatus (MBS reception side) according to Embodiment 3 of the present invention.

FIG. 16 is a block diagram showing a configuration of wireless communication apparatus 600 according to Embodiment 3 of the present invention. In FIG. 16, wireless communication apparatus 600 as the MBS reception apparatus has switches 601 and 602. Switch 601 is provided between reception determination section 206 and a group of data accumulation section 210 and coding unit detection section 207, and controls input of an output signal of reception determination section 206 to data accumulation section 210 and coding unit detection section 207. Switch 602 is provided at the output stage of reception determination section 212.

Switches 601 and 602 are connected to MBS control information extraction section 202 and switch the path of an output signal of reception determination section 206 on the basis of the coding mode identification information received from MBS control information extraction section 202. A first path is a path in which the output signal of reception determination section 206 passes through data accumulation section 210, coding unit detection section 207, error correction decoding section 211, and reception determination section 212. On the other hand, a second path is a path in which the output signal of reception determination section 206 is directly outputted to the output stage of reception determination section 212 without passing through data accumulation section 210, coding unit detection section 207, error correction decoding section 211, and reception determination section 212. Here, also, the first path corresponds to the two-stage coding mode and the second path corresponds to the one-stage coding mode.

Feedback condition determination section 208 is connected to MBS control information extraction section 202 and switches the first feedback condition on the basis of the coding mode identification information received from MBS control information extraction section 202. Specifically, when the coding mode identification information indicates the two-stage coding mode, the same first feedback condition as that in Embodiment 1 and Embodiment 2 is used. On the other hand, when the coding mode identification information indicates the one-stage coding mode, whether or not the reception acknowledgement response of NACK (reception NG) is fed back for each PHY TB in a conventional manner is determined. Also in this case, when an error is detected in PHY TB, the feedback may be performed with a fixed probability instead of always performing the feedback. By doing so, the amount of feedback can be reduced.

As described above, according to the present embodiment, in wireless communication apparatus 500, as path through which a transmission data series (here, MBS information packet) passes, the first path through which the transmission data series is inputted into data unit generation section 106 via error correction coding section 104 and the second path through which the transmission data series is inputted into data unit generation section 106 not via error correction coding section 104 are provided, and coding control section 501 switches the path to the first path or the second path according to the information size of the transmission data series.

In this way, by switching the path to the first path or the second path according to the information size of the transmission data series, when the information size is small and a sufficient coding gain by the coding processing of error correction coding section 104 cannot be obtained, it is possible to select the second path and omit useless coding processing.

Also, in wireless communication apparatus 600, as path through which the output signal of reception determination section 206 passes, the first path through which the output signal is inputted into reception determination section 212 via error correction decoding section 211 and the second path through which the output signal is outputted to the output stage of reception determination section 212 not via error correction decoding section 211 are provided, and switches 601 and 602 switch the path to the first path or the second path according to the coding mode identification information.

At this time, feedback condition determination section 208 switches the first feedback condition on the basis of the coding mode identification information. Specifically, when the coding mode identification information indicates the two-stage coding mode, the same first feedback condition as that in Embodiment 1 and Embodiment 2 is used. On the other hand, when the coding mode identification information indicates the one-stage coding mode, whether or not the reception acknowledgement response of NACK (reception NG) is fed back for each PHY TB in a conventional manner is determined.

By doing so, it is possible to perform feedback of reception state according to presence or absence (use state) of first coding processing.

In the above description, a case in which the error correction coding is performed in both the physical layer (PHY layer) and the data link layer (MAC layer) is described. Specifically, error correction coding section 104 and error correction coding section 109 respectively perform the error correction coding processing in the MAC layer and the PHY layer. However, the present invention is not limited to this, and both error correction coding section 104 and error correction coding section 109 may perform the error correction coding processing in the PHY layer, or error correction coding section 104 may perform in a layer higher than the MAC layer and error correction coding section 109 may perform the error correction coding processing in the PHY layer. In short, the error correction coding processing may be performed in both a first layer included in the physical layer and a second layer higher than or equal to the first layer and lower than the network layer (IP layer).

Other Embodiments (1) Application to Unicast

In Embodiments 1 to 3, a case in which MBS data transmission is performed is described. However, the present invention is not limited to this, but may be applied to a case in which individual data is transmitted to a terminal user. In this case, the transmission apparatus described in Embodiments 1 to 3 transmits user individual data instead of MBS data and transmits individual data control information instead of MBS control information. The content of the individual data control information may be the same as that of the MBS control information. On the other hand, the reception apparatus described in Embodiments 1 to 3 recognizes individual data control information whose destination is the reception apparatus, and when user individual data whose destination is the reception apparatus is included in the reception signal, the reception apparatus performs reception operation and feeds back a reception acknowledgement response (ACK information or NACK information).

(2) Link Adaptation Other than Adaptive Modulation

Figure 17:
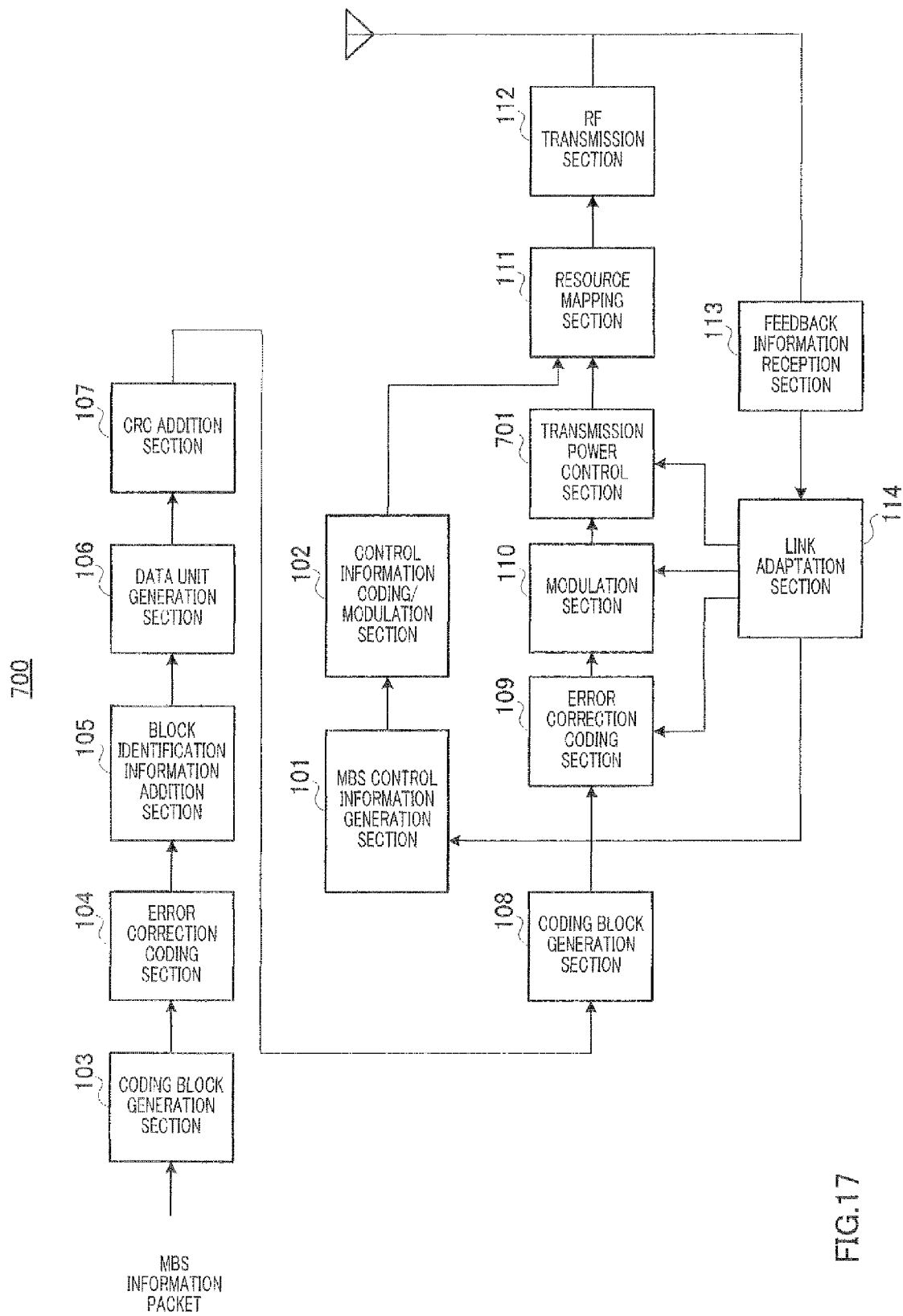
FIG. 17 is a block diagram showing a configuration of a wireless communication apparatus (MBS transmission side) according to another embodiment.

In Embodiments 1 to 3, link adaptation is performed on MCS (coding rate of error correction coding section 109 or multi-value modulation number used in modulation section 110). However, the present invention is not limited to this, and link adaptation may be performed on transmission power. As an example, FIG. 17 shows a configuration of wireless communication apparatus 700 in which a transmission power control is applied to Embodiment 1. In FIG. 17, wireless communication apparatus 700 has transmission power control section 701.

Link adaptation section 114 controls transmission power (amplitude of output signal) in transmission power control section 701 on the basis of the reception acknowledgement response received from feedback information reception section 113. This control is performed when Link adaptation section 114 outputs transmission power control information to transmission power control section 701. Specifically, when receiving the reception acknowledgement response of NACK (reception NG), link adaptation section 114 outputs transmission power control information to increase the transmission power of MBS data. By this means, reception quality of MBS data can be improved.

Transmission power control section 701 multiplies a modulation signal received from modulation section 110 by a coefficient according to the transmission power control information received from link adaptation section 114, and outputs a signal whose power is adjusted.

Figure 18:
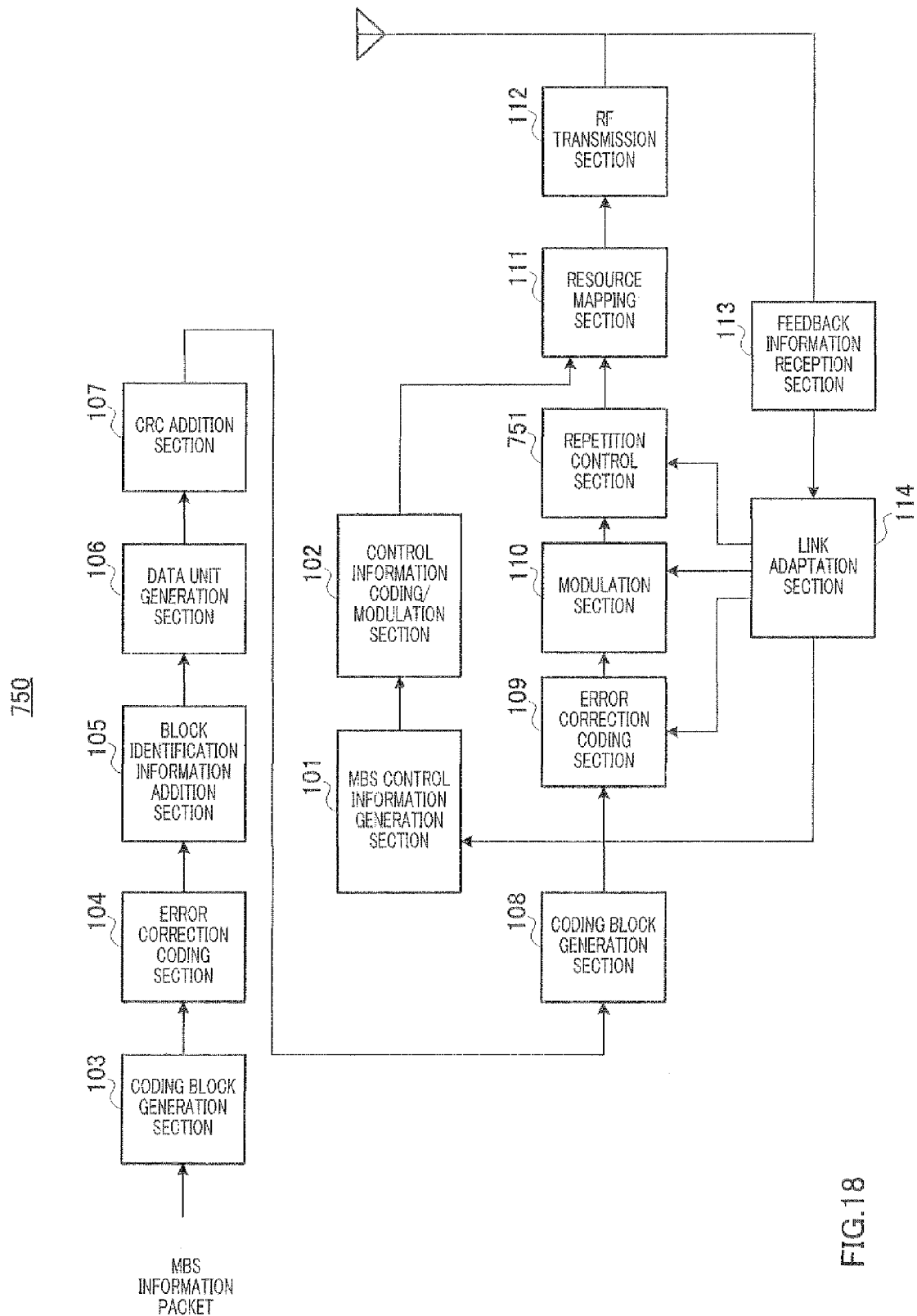
FIG. 18 is a block diagram showing a configuration of a wireless communication apparatus (MBS transmission side) according to another embodiment.

When the same MBS data is repeatedly transmitted, the number of repeats (that is, the number of repetitions) may be adjusted. As an example, FIG. 18 shows a configuration of wireless communication apparatus 750 in which repetitive transmission is applied to Embodiment 1. In FIG. 17, wireless communication apparatus 750 has repetition control section 751.

Link adaptation section 114 controls the number of repetitions of repetition control section 751 on the basis of the reception acknowledgement response received from feedback information reception section 113. This control is performed when Link adaptation section 114 outputs repetition control information to repetition control section 751. Specifically, when receiving the reception acknowledgement response of NACK (reception NG), link adaptation section 114 outputs repetition control information to increase the number of repetitions. By this means, reception quality of MBS data can be improved.

Repetition control section 751 repeatedly outputs the modulation signal received from modulation section 110 the number of times corresponding to the repetition control information received by link adaptation section 114.

Figure 19:
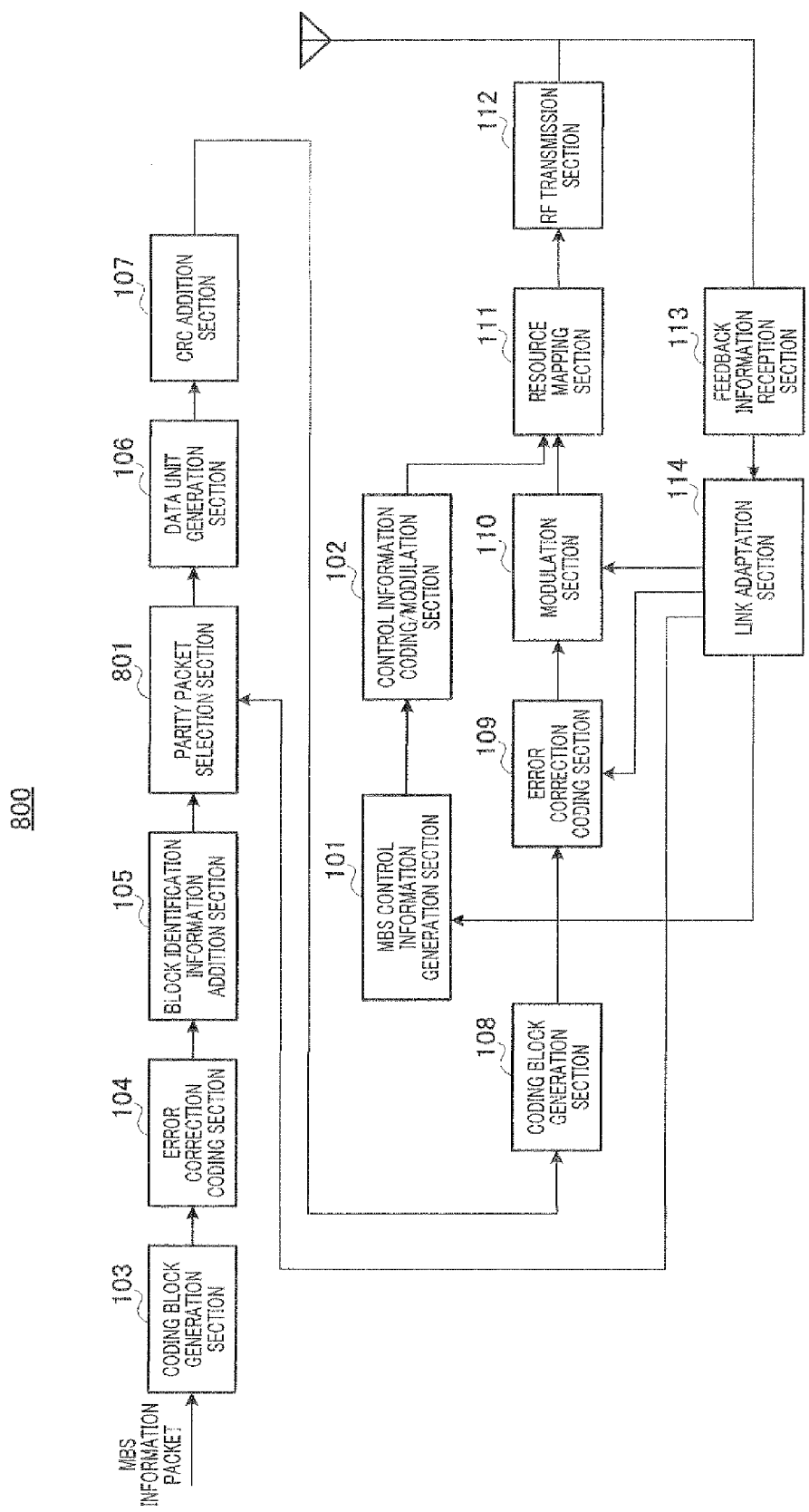
FIG. 19 is a block diagram showing a configuration of a wireless communication apparatus (MBS transmission side) according to another embodiment.
Figure 20:
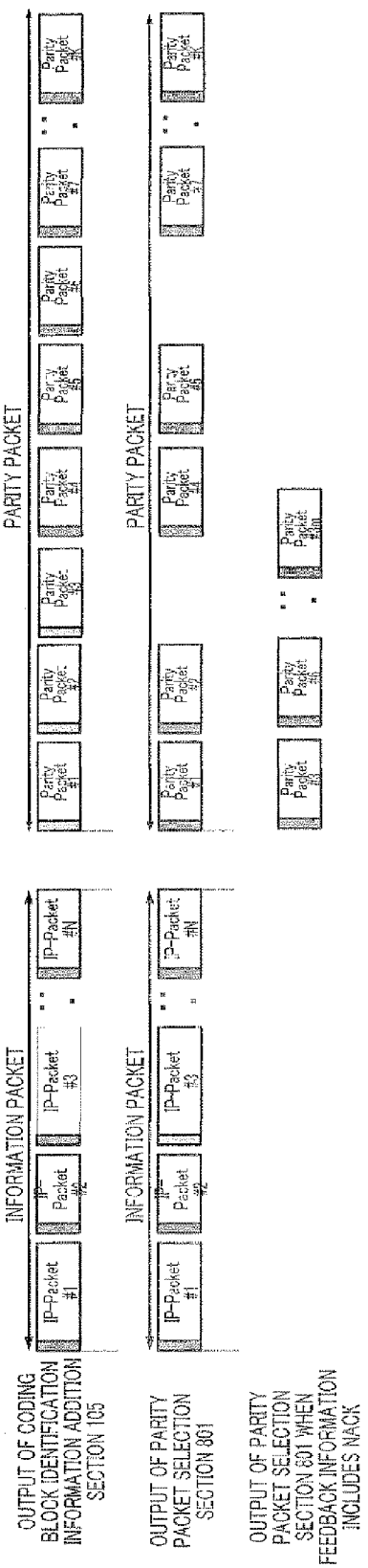
FIG. 20 explains an operation of the wireless communication apparatus in FIG. 19.

The coding rate of error correction coding section 104 may be adjusted. As an example, FIG. 19 shows a configuration of wireless communication apparatus 800 in which adjustment of coding rate of outer code is applied to Embodiment 1. In FIG. 19, wireless communication apparatus 800 has parity packet selection section 801.

Link adaptation section 114 controls a selection pattern of parity packets in parity packet selection section 801 on the basis of the reception acknowledgement response received from feedback information reception section 113. This control is performed when Link adaptation section 114 outputs selection pattern control information to parity packet selection section 801. Specifically, link adaptation section 114 outputs selection pattern control information indicating a first selection pattern to select parity packets, the number of which corresponds to K×S, from K parity packets. When receiving the reception acknowledgement response of NACK (reception NG), link adaptation section 114 outputs selection pattern control information indicating a second selection pattern to additionally output K×(1−S) parity packets stored in a buffer included in parity packet selection section 801 without outputting parity packets by the first selection pattern. Here, S is a value greater than or equal to 0 and smaller than or equal to 1. Processing such as rounding up, rounding down, and rounding off is appropriately performed so that the value of K×(1−S) is an integer. For example, if S=2/3, parity packet selection section 801 sequentially and recursively uses a first selection pattern [1 1 0] to select two parity packets from three parity packets for inputted parity packets. Among the elements representing the selection pattern, "1" means selectively outputting the parity packet and "0" means storing the parity packet without outputting the parity packet.

Parity packet selection section 801 outputs the MBS information packet group in the MAC FEC block received from block identification information addition section 105 without change and selectively outputs a part of parity packet group by using a selection pattern. Parity bits not selected at this time are selected by another selection pattern, so the parity packets are temporarily stored in the buffer included in parity packet selection section 801.

By changing selection pattern of parity packet in this way, the coding rate of error correction coding section 104 can be adjusted. When link adaptation section 114 does not receive the reception acknowledgement response of NACK (reception NG), link adaptation section 114 outputs a selection pattern having a high coding rate of error correction coding section 104. By this means, wireless communication apparatus 800 can transmit MBS data by a small number of packets, so frequency use efficiency can be increased. On the other hand, when link adaptation section 114 receives the reception acknowledgement response of NACK (reception NG), link adaptation section 114 outputs a selection pattern for additionally outputting parity packets. By this means, the coding rate of error correction coding section 104 is reduced. In the MBS reception apparatus, error correction decoding section 211 performs decoding processing by using the additionally transmitted parity packets. By this means, a higher coding rate can be obtained and reception quality of MBS data can be improved.

Figure 21:
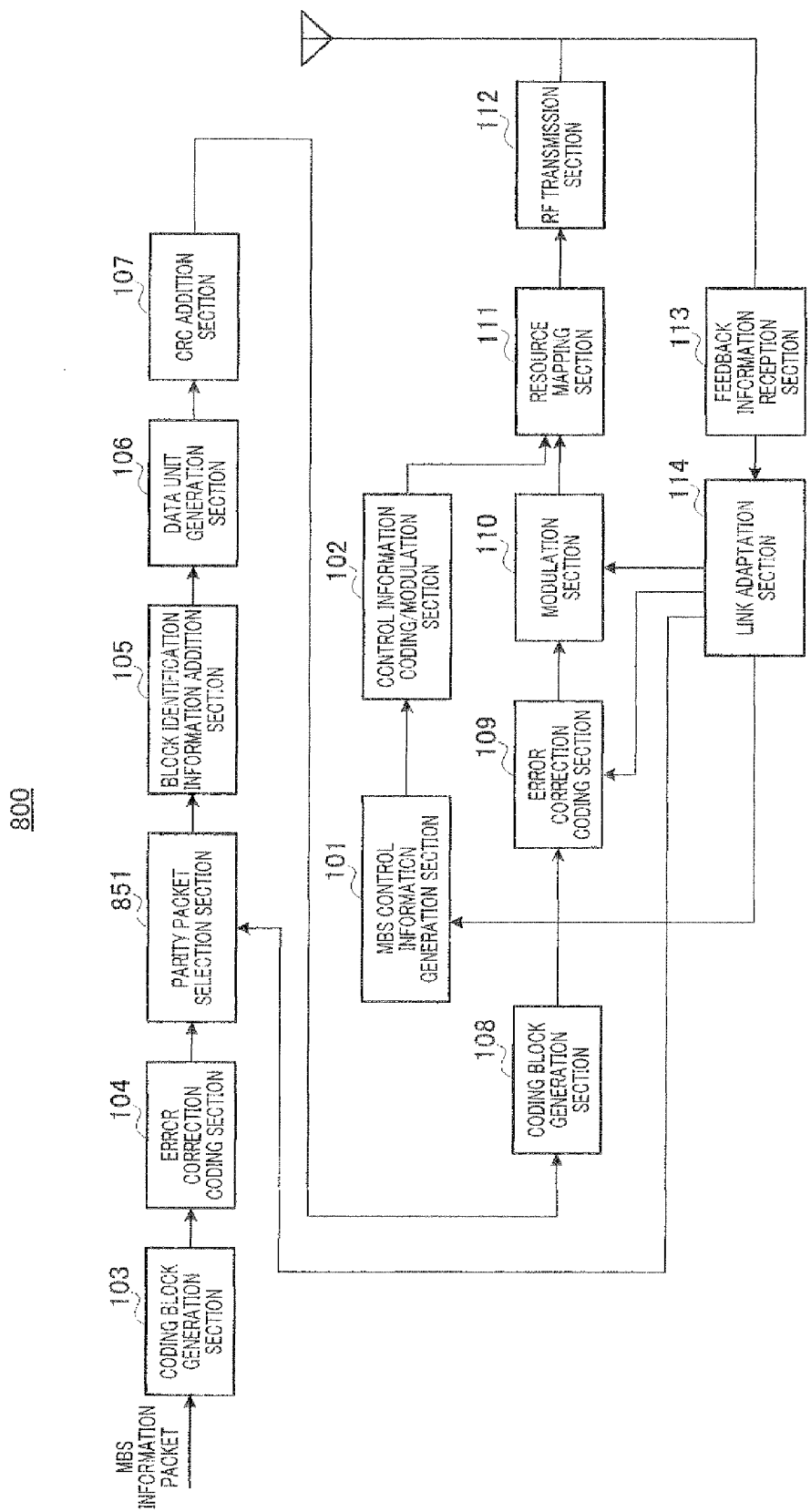
FIG. 21 is a block diagram showing a configuration of a wireless communication apparatus (MBS transmission side) according to another embodiment.

The position of parity packet selection section 801 in FIG. 19 may be changed and, as shown in FIG. 21, parity packet selection section 851 may be provided between error correction coding section 104 and block identification information addition section 105.

(3) Expression of Coder

Error correction coding section 104 in the above embodiments may be referred to as outer coding device, outer coding unit, or outer coder. Error correction coding section 109 may be referred to as inner coding device, inner coding unit, or inner coder. Error correction decoding section 211 may be referred to as outer code decoding device or outer decoder. Error correction decoding section 205 may be referred to as inner code decoding device or inner decoder.

(4) FB Information

The above embodiments, information fed back from the MBS reception apparatus (feedback information or FB information) is described as a reception acknowledgement response (positive acknowledgement response ACK or negative acknowledgement response NACK). However, the present invention is not limited to this, and reception quality information such as SNR information, SINR information, and CQI (Channel quality index) information may be fed back in addition to the reception acknowledgement response. Or, MCS information that satisfies reception quality in the MBS reception apparatus may be fed back. When the feedback information described above is used, link adaptation section 114 can also perform a link adaptation control in which the reception quality of MBS data satisfies a required level.

(5) Also, Although Cases have been Described with the Above Embodiment as Examples where the Present Invention is Configured by Hardware, the Present Invention can Also be Realized by Software Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-020864, filed on Jan. 30, 2009, including the specification, drawings and abstract, is incorporated herein by reference in its entirety.

INDUSTRIAL APPLICABILITY

The wireless transmission apparatus, the wireless reception apparatus, the transmission data formation method, and the data reception method of the present invention are effective to employ the link adaptation based on the error correction code and the feedback information in the second layer higher than or equal to the first layer included in the physical layer.

The invention claimed is:

1. A wireless transmission apparatus that transmits data coded by error correction coding in, respectively, a first layer included in a physical layer and a second layer higher than the first layer, the wireless transmission apparatus comprising:
   a second layer coding section that codes a transmission data series by a coding unit in the second layer and divides coded data into a plurality of data units;
   an identification information addition section that adds identification information for identifying the coding unit in the second layer to each of the plurality of data units; and
   a first layer processing section that includes error correction coding for coding each of the plurality of data units, to which the identification information is added, by a coding unit in the first layer, wherein:
   the identification information added to each of the plurality of data units identifies that each of the plurality of data units is comprised of a same coding unit in the second layer,
   wherein the wireless transmission apparatus comprises an adjustment section that adjusts a first layer transmission parameters used by the first layer processing section on the basis of feedback information from a wireless reception apparatus that receives the transmission data.

2. The wireless transmission apparatus according to claim 1, wherein the first layer transmission parameters are a M-ary modulation value, a coding rate, a value of transmission power, and the number of repetitions.

3. The wireless transmission apparatus according to claim 1, further comprising:
   a feedback condition adjustment section that adjusts feedback condition from a wireless reception apparatus that receives the transmission data on the basis of feedback information from the wireless reception apparatus; and
   a notification section that notifies the wireless reception apparatus of information related to the adjusted feedback condition.

4. The wireless transmission apparatus according to claim 1, further comprising:
   a first path through which the transmission data series is inputted into the first layer processing section via the second layer coding section and the identification information addition section and a second path through which the transmission data series is inputted into the first layer processing section not via the second layer coding section and the identification information addition section as path through which the transmission data series proceeds;
   a switching section that switches the path to the first path or the second path; and
   a notification section that notifies a receiving side of the transmission data series of coding switching information indicating which path out of the first path and the second path is used.

5. The wireless transmission apparatus according to claim 1, wherein
the identification information addition section adds the identification information with bit information alternately inverted for each coding unit in the second layer.

6. The wireless transmission apparatus according to claim 1, wherein
the identification information addition section adds, to a specific data unit included in the plurality of data units, identification information different from that of a plurality of data units other than the specific data unit.

7. A transmission data formation method that forms transmission data coded by error correction coding in, respectively, a first layer included in a physical layer and a second layer higher than the first layer, the transmission data formation method comprising:

coding a transmission data series by a coding unit in the second layer and dividing coded data into a plurality of data units;

adding identification information for identifying the coding unit in the second layer to each of the plurality of data units; and including error correction coding for coding each of the plurality of data units, to which the identification information is added, by a coding unit in the first layer, wherein:

the identification information added to each of the plurality of data units identifies that each of the plurality of data units is comprised of a same coding unit in the second layer, wherein the method further comprises first layer transmission parameters used by the first layer processing section on the basis of feedback information from a wireless reception apparatus that receives the transmission data.

* * * * *